(12) United States Patent
Wen et al.

(10) Patent No.: US 9,572,082 B2
(45) Date of Patent: Feb. 14, 2017

(54) METHOD FOR DIGITAL COMMUNICATION, RADIO COMMUNICATION SYSTEM, AND RADIO COMMUNICATION APPARATUS

(71) Applicant: FUJITSU LIMITED, Kawasaki-shi, Kanagawa (JP)

(72) Inventors: Yun Wen, Kawasaki (JP); Takeshi Umemoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 14/656,224

(22) Filed: Mar. 12, 2015

(65) Prior Publication Data

US 2015/0264628 A1 Sep. 17, 2015

(30) Foreign Application Priority Data

Mar. 14, 2014 (JP) .................. 2014-051662
Feb. 20, 2015 (JP) .................. 2015-031541

(51) Int. Cl.
*H04W 40/22* (2009.01)
*H04W 72/04* (2009.01)
(Continued)

(52) U.S. Cl.
CPC ......... *H04W 40/22* (2013.01); *H04B 7/15507* (2013.01); *H04B 7/2606* (2013.01);
(Continued)

(58) Field of Classification Search
CPC .. H04W 40/22; H04W 72/0446; H04W 88/04; H04B 7/2606; H04B 7/156507; Y02B 60/50
See application file for complete search history.

(56) References Cited

U.S. PATENT DOCUMENTS 6,718,159 B1 4/2004 Sato
2010/0157875 A1* 6/2010 Li .................. H04B 7/2615
370/315
(Continued)

FOREIGN PATENT DOCUMENTS

JP 2004-104465 A 4/2004
JP 2005-348203 A 12/2005
(Continued)

OTHER PUBLICATIONS

"Part 15.6: Wireless Body Area Networks (IEEE Std 802.15.6TM-2012)", IEEE Standard for Local and metropolitan area networks, 271 pp., IEEE Standards Association, New York, New York, Feb. 29, 2012.
(Continued)

*Primary Examiner* — Robert Wilson
(74) *Attorney, Agent, or Firm* — Arent Fox LLP

(57) ABSTRACT

A method for digital communication in a system including a gateway apparatus, a first radio communication apparatus, and a second radio communication apparatus, the method including: at the first radio communication apparatus, sending first data to the gateway apparatus during a first time slot of a radio frame, the radio frame including a common slot, the first time slot allocated to the first radio communication apparatus for data transmission, and a second time slot allocated to the second radio communication apparatus for data transmission; determining whether the first data has been received by the gateway apparatus; upon determining that the first data has not been received by the gateway apparatus, sending a relay request signal to the second radio communication apparatus during the common slot of the radio frame; in response to the relay request signal, receiving a response signal from the second radio communication apparatus.

30 Claims, 21 Drawing Sheets

(51) Int. Cl.
*H04B 7/155* (2006.01)
*H04B 7/26* (2006.01)
*H04W 88/04* (2009.01)

(52) U.S. Cl.
CPC ........ *H04W 72/0446* (2013.01); *H04W 88/04* (2013.01); *Y02B 60/50* (2013.01)

(56) References Cited

U.S. PATENT DOCUMENTS

| | | |
|---|---|---|
| 2011/0053494 A1 | 3/2011 | Kobayakawa |
| 2013/0178150 A1 | 7/2013 | Park et al. |
| 2013/0242806 A1* | 9/2013 | Nagata .............. H04W 72/0446 370/256 |
| 2013/0336196 A1 | 12/2013 | Abraham et al. |
| 2015/0264628 A1* | 9/2015 | Wen ..................... H04W 40/22 370/315 |

FOREIGN PATENT DOCUMENTS

| | | |
|---|---|---|
| JP | 2009-523388 A | 6/2009 |
| JP | 2011-55374 A | 3/2011 |
| JP | 2011-223419 A | 11/2011 |
| JP | 2013-81128 A | 5/2013 |
| WO | WO 2007/082256 A1 | 7/2007 |

OTHER PUBLICATIONS

European Search Report dated Aug. 25, 2015; Application No. 15158559.3.

* cited by examiner

RADIO COMMUNICATION SYSTEM 10

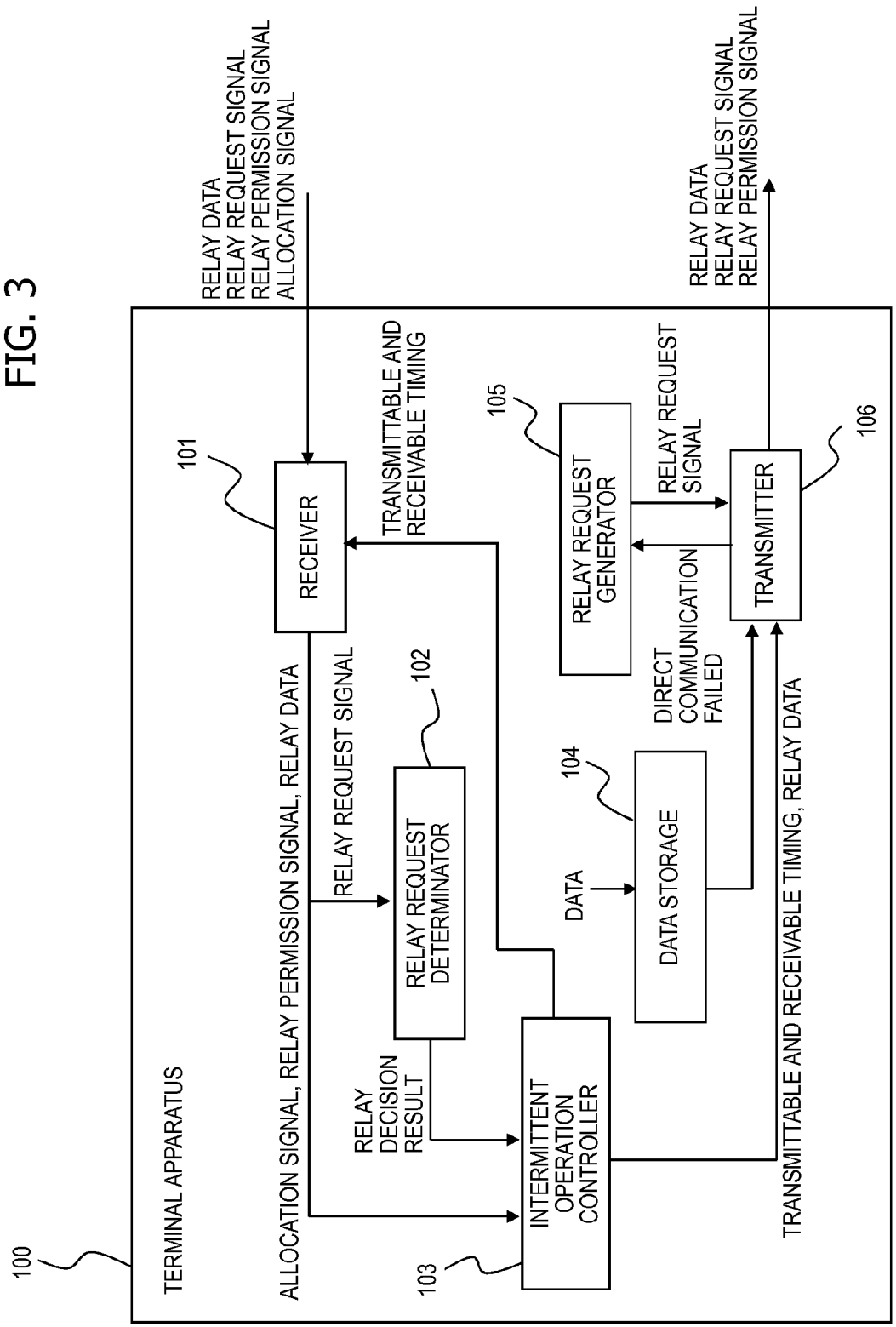

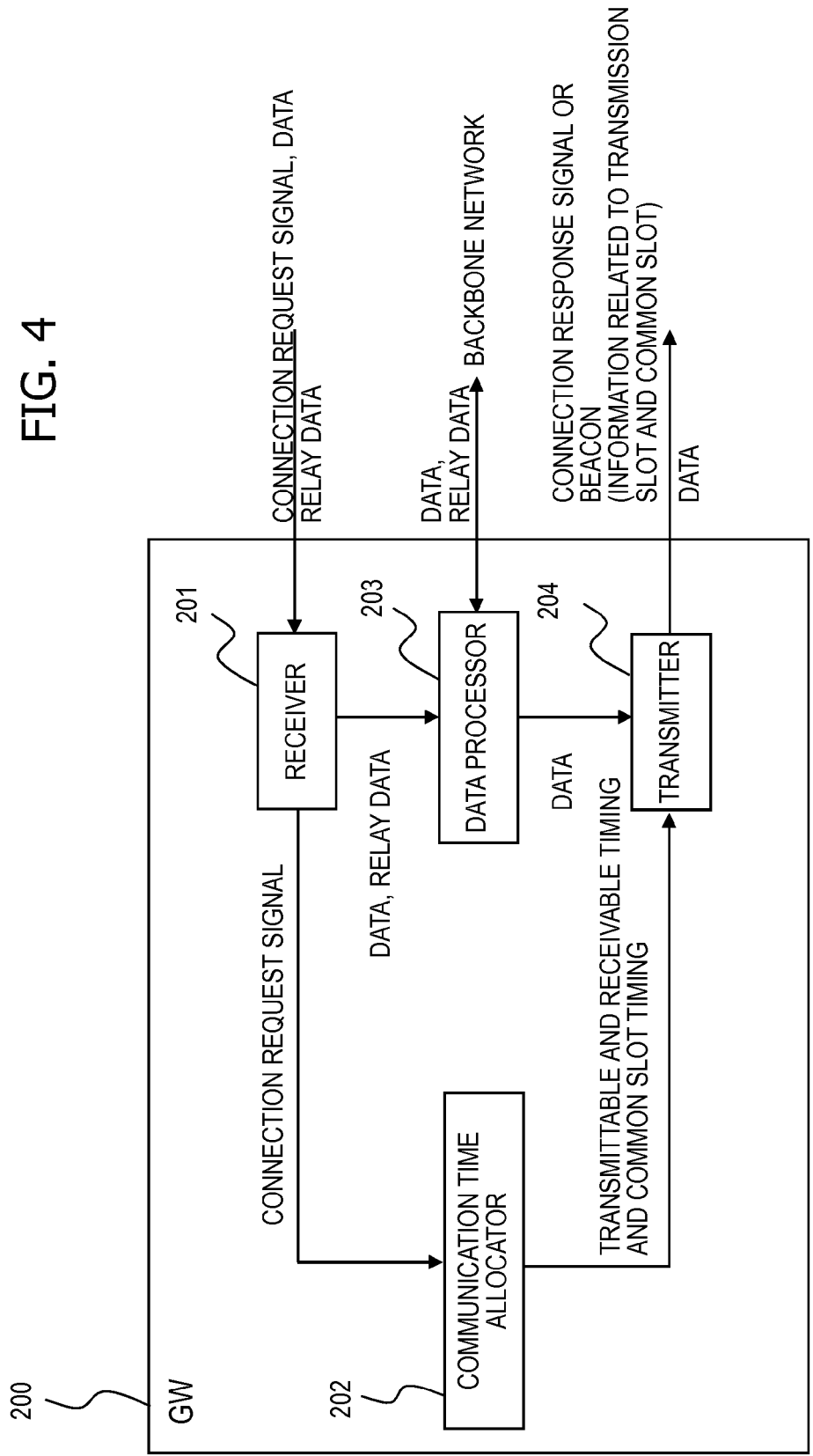

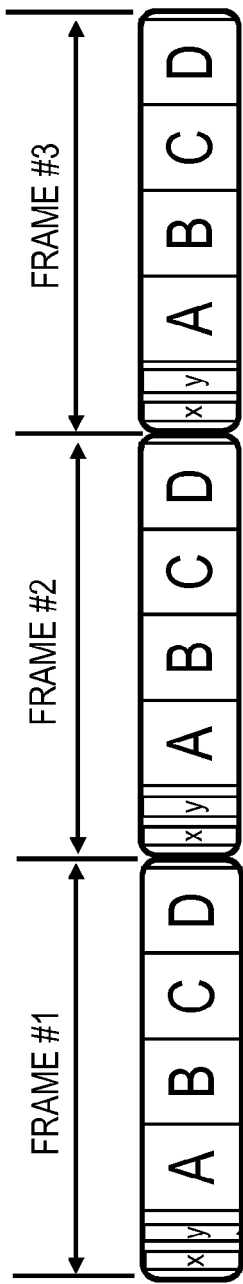
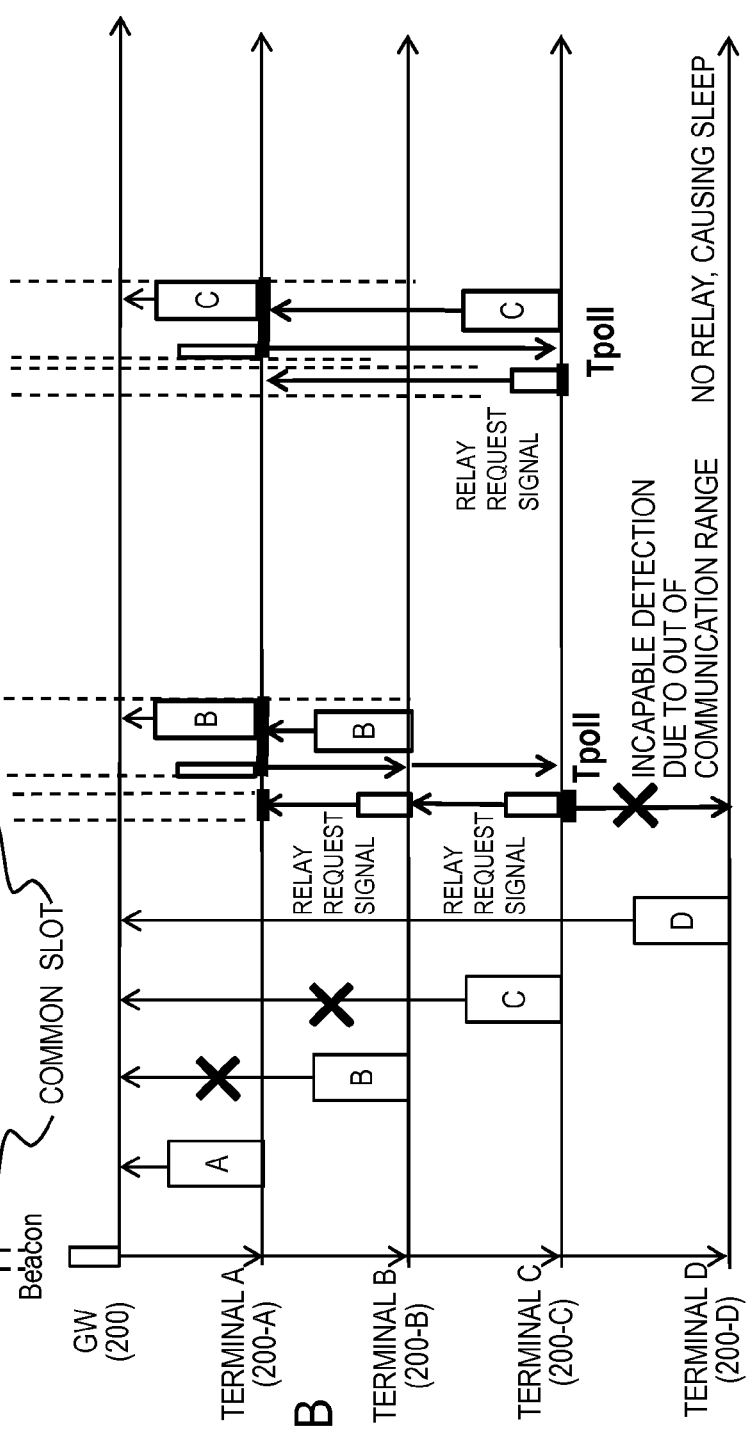
FIG. 9A
FIG. 9B

| NUMBER OF TERMINALS FAILING IN SIMULTANEOUS TRANSMISSION | TIME INFORMATION (TIME STAMP INFORMATION) | |
|---|---|---|
| 2 | FRAME #5<br>FRAME #10<br>⋮ | } N1 time |
| 3 | FRAME #1<br>⋮ | } N2 time |
| ⋮ | ⋮ | |

231

2 TERMINALS  100 TIMES → 50%
3 TERMINALS   60 TIMES → 30%
4 TERMINALS   40 TIMES → 20%

METHOD FOR DIGITAL COMMUNICATION, RADIO COMMUNICATION SYSTEM, AND RADIO COMMUNICATION APPARATUS

CROSS-REFERENCE TO RELATED APPLICATION

This application is based upon and claims the benefit of priority of the prior Japanese Patent Application No. 2014-051662, filed on Mar. 14, 2014, and Japanese Patent Application No. 2015-031541, filed on Feb. 20, 2015, the entire contents of which are incorporated herein by reference.

FIELD

The embodiments discussed herein are related to a method for digital communication, a radio communication system, and a radio communication apparatus.

BACKGROUND

A multi-hop radio communication system has presently attracted attention. In the multi-hop radio communication system, a terminal apparatus performs radio communication with an access point through another terminal apparatus. If the terminal apparatus is incapable of direct radio communication with the access point, the terminal apparatus can transmit data to the access point through the other terminal apparatus. This enables an increase of a data arrival rate to the access point with a reduced delay. As examples of the multi-hop radio communication system, there are a BAN (Body Area Network) and sensor networks for monitoring a forest fire, intrusion of a suspicious person, etc.

In the multi-hop radio communication system, radio communication may be performed by a TDMA (Time Divisional Multiple Access) method in some cases. In the TDMA method, each terminal apparatus performs radio communication using a time slot allocated thereto. Typically, there is a communication method in a beacon mode provided in an IEEE 802.15.6 standard. According to the beacon mode communication method, the terminal apparatus performs radio communication on the basis of time slot information that is included in a beacon signal received from the access point, for example.

The terminal apparatus using the TDMA method shifts to an operating state (or active mode) at the time slot allocated to the self-terminal, to perform data transmission and reception. On the other hand, in other than the allocated time slot, the terminal apparatus shifts to a power saving state (or sleep mode) in which data transmission and reception are not performed. Power consumption in the terminal apparatus is reduced by means of such intermittent operation.

As a technique related to such a radio communication system, there is a technique as follows, for example.

Namely, there is a radio communication system in which a hub, on detecting a communication disconnection with a node 4, requests nodes 2, 3 to search for the node 4, and if the hub receives from the node 3 a discovery notification of the node 4, the hub allocates a relay band, so as to perform radio communication with the node 4 through the node 3.

It is said that according to the above technique, power consumption in the relay node can be reduced because a relay node that discovers the node 4 transmits notification information, whereas a relay node that fails to discover the node 4 does not transmit any notification information.

Further, there is also disclosed a multi-hop radio ad hoc network system, in which all terminals and a gateway in a network perform switchover operation between activation and sleep, in synchronization with an activation cycle, an activation phase and an activation period, to execute data transfer during the activation period, whereas perform minimal operation during the sleep period.

According to the above technique, it is said that low power consumption can be achieved because of achieving an efficient sleep mode.

Moreover, there is also a radio communication apparatus, in which, as attribute information of at least the self-station and neighboring stations that are directly communicable with the self-station, relay capability data indicative of whether each radio station is available as a relay station is retained in the radio station, so that a neighboring station, which is capable of relaying and selected on the basis of the relay capability data of the neighboring stations, is utilized as a relay station.

According to the above technique, it is said that the radio communication apparatus, which is available as a radio station constituting a multi-hop radio communication network and available as a relay station and capable of preferentially executing communication of the self-station, can be provided.

PRIOR TECHNICAL DOCUMENTS

Patent Documents

[Patent document 1] Japanese Laid-open Patent Publication No. 2013-81128.
[Patent document 2] Japanese Laid-open Patent Publication No. 2011-223419.
[Patent document 3] Japanese Laid-open Patent Publication No. 2005-348203.

Non-Patent Documents

[Non-patent document 1] IEEE 802.15.6

However, in the technique in which the hub requests a search for a disconnected node, if the hub fails to confirm uplink transmission in the period allocated to the node, the node of concern is detected as the disconnected node. In this case, it is not possible for the hub to detect the cause of the disconnection whether because the node concerned fails in uplink transmission or because the node concerned does not execute uplink transmission in an allocated period. That is, there may be a case when the hub allocates a relay band to a node which is directly communicable with the hub, despite that the hub is not currently performing uplink transmission in the allocated period. Therefore, taking into account the case of wasteful allocation of the relay band to the hub, there is a case when the hub is unable to decide the possibility and impossibility of relay, which makes impossible relay through the node.

Also, according to the technique in which the hub requests a search for a disconnected node, the node not performing relay shifts to the active mode at the time slot allocated to the self-node, so as to wait for receiving data transmitted from the disconnected node. In this case, the node not performing relay shifts to the active mode in spite of not performing relay, which causes a waste of power consumption during the active mode period.

Meanwhile, also in the technique in which all terminals and the gateway in the network perform switchover operation between activation and sleep in synchronization with the activation cycle, the activation phase and the activation period, even a terminal not performing data relay is also made active in the activation period. As such, power consumption in the terminal during the activation period is wasteful.

Moreover, in regard to the technique in which each radio station retains the relay capability data, the radio station once shifts to the active mode to perform operation. However, there has been no disclosure about how the relay station is selected if the radio station performs intermittent operation.

SUMMARY

According to an aspect of the invention, a method for digital communication in a system including a gateway apparatus, a first radio communication apparatus, and a second radio communication apparatus, the first radio communication apparatus and the second radio communication apparatus each being configured to wirelessly transmit data to the gateway apparatus, the method including: at the first radio communication apparatus, sending first data to the gateway apparatus during a first time slot of a radio frame, the radio frame including a common slot, the first time slot allocated to the first radio communication apparatus for data transmission, and a second time slot allocated to the second radio communication apparatus for data transmission; determining whether the first data has been received by the gateway apparatus; upon determining that the first data has not been received by the gateway apparatus, sending a relay request signal to the second radio communication apparatus during the common slot of the radio frame; in response to the relay request signal, receiving a response signal from the second radio communication apparatus; and when the response signal comprises a relay permission signal from the second radio communication apparatus, sending the first data, as relay data, to the second radio communication apparatus such that the first data is to be transmitted to the gateway apparatus by the second radio communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating a configuration example of a terminal.

FIG. 4 is a diagram illustrating a configuration example of a GW.

FIG. 9A is a diagram illustrating a configuration example of a frame, and FIG. 9B is a diagram illustrating an operation example when relay is performed.

DESCRIPTION OF EMBODIMENTS

Hereinafter, embodiments of the present invention will be described. Description will be given first on a configuration example of a processing apparatus according to the present embodiment, and next, on an example of vector data generation processing performed in the processing apparatus.

First Embodiment

Figure 1:
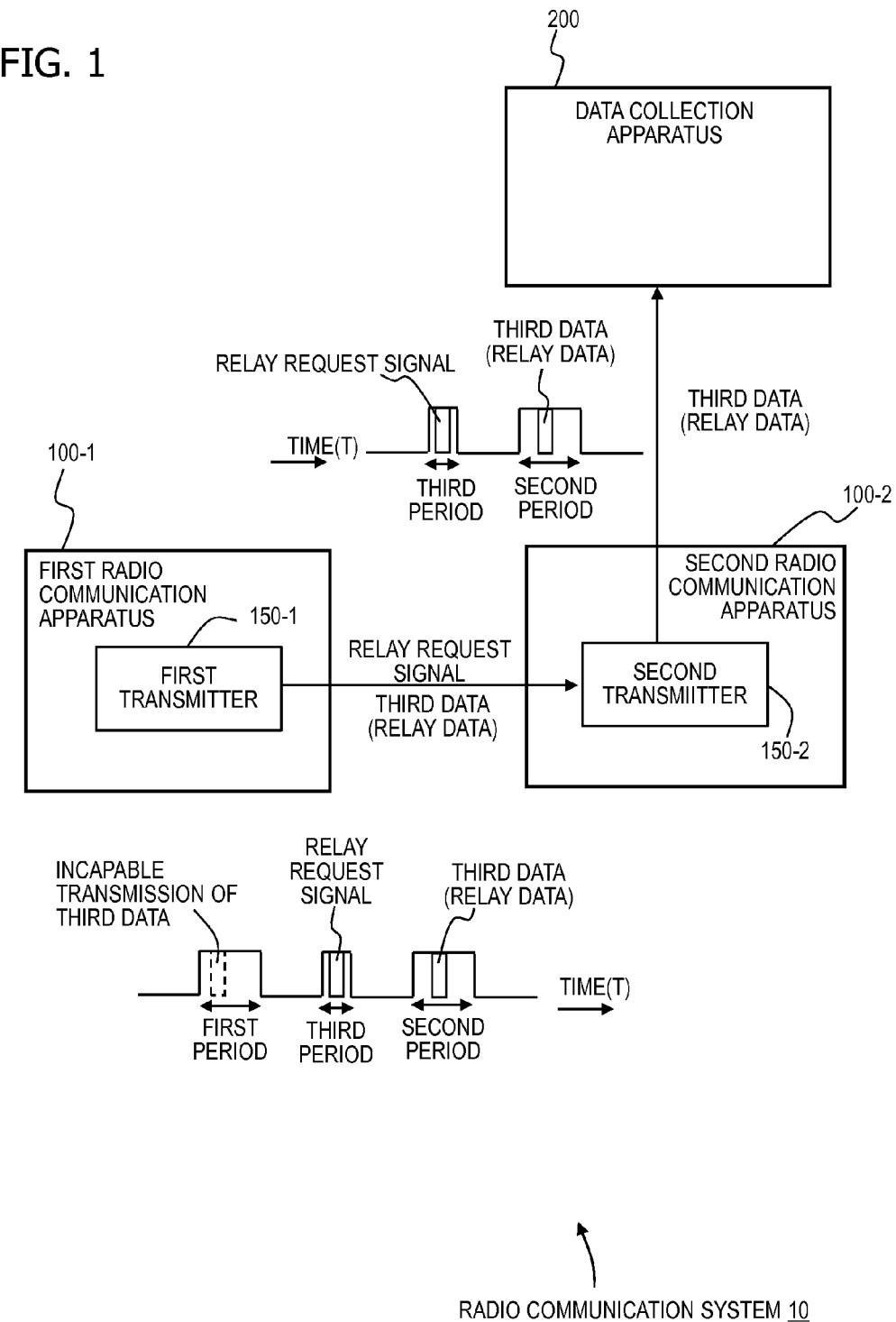
FIG. 1 is a diagram illustrating a configuration example of a radio communication system.

A first embodiment will be described. FIG. 1 is a diagram illustrating a configuration example of a radio communication system 10 according to the first embodiment.

The radio communication system 10 includes a first and second radio communication apparatuses 100-1, 100-2, and a data collection apparatus 200.

The first and second radio communication apparatuses 100-1, 100-2 shift to an operating state in a first and a second period respectively, to transmit first and second data to the data collection apparatus 200 respectively, whereas shift to a power saving state in other periods than the first and second periods. The first and second radio communication apparatuses 100-1, 100-2 perform intermittent operation in which the operating state and the power saving state are repeated, to thereby enable the reduction of power consumption in comparison with a case of a continuous operating state, for example.

The radio communication apparatus 100-1 includes a first transmitter 150-1. When the first radio communication apparatus 100-1 fails to transmit third data to the data collection apparatus 200 in the first period, the first transmitter 150-1 shifts to the operating state in a third period, which is allocated to the first and second radio communication apparatuses 100-1, 100-2 by the data collection apparatus 200. The third period is a period commonly used by the first and second radio communication apparatuses 100-1, 100-2, for example.

In the third period, the first transmitter 150-1 transmits a relay request signal for requesting to relay the third data. For example, the first transmitter 150-1 broadcast transmits the relay request signal.

Further, after transmitting the relay request signal, the first transmitter 150-1 transmits, in the second period, the third data to the second radio communication apparatus 100-2. In this case, the third data comes to relay data.

Meanwhile, the second radio communication apparatus 100-2 includes a second transmitter 150-2. When shifting to the operating state in the third period to receive the relay request signal, the second transmitter 150-2 receives in the second period the third data transmitted from the first radio communication apparatus 100-1, to transmit the received the data to the data collection apparatus 200.

This causes the transmission of the third data from the first radio communication apparatus 100-1 through the second radio communication apparatus 100-2 to the data collection apparatus 200.

As such, according to the present first embodiment, when the first radio communication apparatus 100-1 fails to transmit the third data to the data collection apparatus 200, the first radio communication apparatus 100-1 transmits a relay request signal, using the third period allocated to the first and second radio communication apparatuses 100-1, 100-2. In this case, the second radio communication apparatus 100-2, on receipt of the relay request signal, functions as a relay apparatus, so that the second radio communication apparatus 100-2 receives the third data from the first radio communication apparatus 100-1, in the second period allocated to the self-terminal, to transmit (or relay) the received third data to the data collection apparatus 200.

In this case, the data collection apparatus 200 does not detect whether the first radio communication apparatus 100-1 fails to transmit the third data or does not transmit the third data. The radio communication system 10 can perform relay without such detection in the data collection apparatus 200.

Therefore, it is possible to provide a radio communication system capable of data relay if the data collection apparatus 200 does not detect whether the first radio communication apparatus 100-1 fails to transmit data or does not transmit data.

Further, when there is a third radio communication apparatus that is not involved in relay operation in the radio communication system 10, the third radio communication apparatus is configured to enable the above-mentioned relay operation even in a power saving state, without becoming an operating state in a period allocated to the self-terminal. Therefore, it is possible to reduce power consumption in the third radio communication apparatus in comparison with a case when the third radio communication apparatus becomes the continuous operating state in the period allocated to the self-terminal.

Further, in the first and second radio communication apparatuses 100-1, 100-2, because no relay operation is performed after the transmission of the third data, the power saving state can be set in the first and second periods allocated to the respective self-terminals. Therefore, in the first and second radio communication apparatuses 100-1, 100-2, it is possible to reduce power consumption in comparison with a case when the first and second radio communication apparatuses 100-1, 100-2 are in the continuous operating state in the first and second periods allocated to the respective self-terminals.

Second Embodiment

Next, a second embodiment will be described. First, description will be given on a configuration example of the radio communication system 10.

<Configuration Example of Radio Communication System 10>

Figure 2:
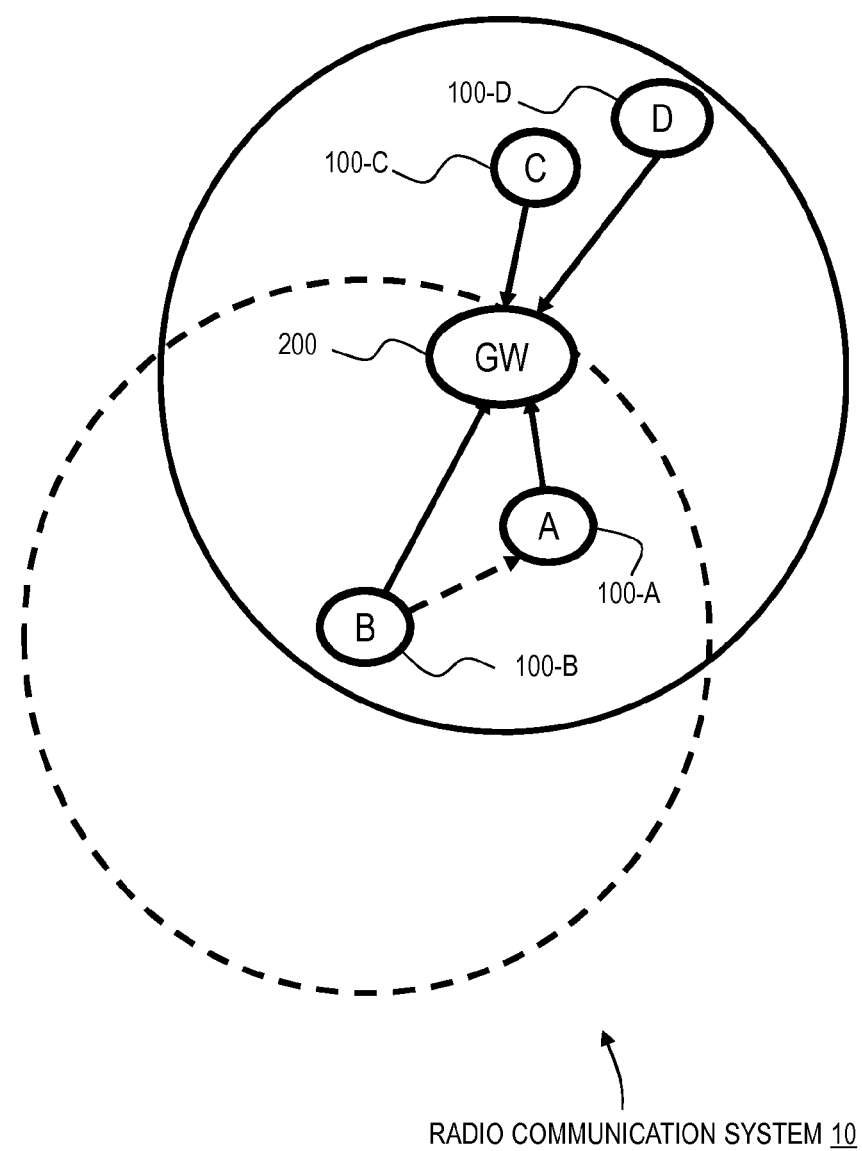
FIG. 2 is a diagram illustrating a configuration example of a radio communication system.

FIG. 2 is a diagram illustrating a configuration example of the radio communication system 10 according to the second embodiment. The radio communication system 10 includes a plurality of terminal apparatuses (which may hereafter be referred to as "terminals") 100-A to 100-D and a gateway (or gateway apparatus, which may hereafter be referred to as "GW") 200.

In FIG. 2, a circle depicted around the GW 200 with a solid line indicates the communicable range of the GW 200. Also, a circle depicted around the terminal 100-B with a dotted line indicates the communicable range of the terminal 100-B.

The radio communication system 10 depicted in FIG. 2 represents a state that the terminals 100-A to 100-D perform direct radio communication with the GW 200. For example, when the terminal 100-B becomes unable to perform direct radio communication with the GW 200, the terminal 100-B transmits data to the GW 200 through the terminal 100-A. In this case, the terminal 100-A comes to a relay terminal for the terminal 100-B.

Such radio communication of the terminal 100-B with the GW 200 through the relay terminal 100-A may be referred to as multi-hop communication, for example.

Additionally, the first radio communication apparatus 100-1 in the first embodiment corresponds to the terminal 100-B, for example. Also, the second radio communication apparatus 100-2 in the first embodiment corresponds to the terminal 100-A, for example.

Also, each terminal 100-A to 100-D is movable, and can set a route between with the GW 200 and other terminals autonomously, without subordinate to control from the GW 200. Such a radio communication system including a plurality of terminals 100-A to 100-D and a GW 200 may be referred to as an ad hoc radio communication system (or ad hoc network system).

The radio communication system 10 may be used in a system such as a BAN and a smart meter system, in which data transmission is performed periodically.

For example, when the radio communication system 10 is used for a BAN, each terminal 100-A to 100-D acquires data output from each sensor such as a pulse rate sensor and a blood flow sensor, and transmits the acquired data to the GW 200 by radio. The GW 200 collects the data transmitted from each terminal 100-A to 100-D, and transmits the collected data to a backbone network. In this case, each terminal 100-A to 100-D periodically collects data from the sensor and transmits the acquired data to the GW 200.

Also, the radio communication system 10 may be used for a sensor network system (or security system) etc. for monitoring a forest fire, the intrusion of a suspicious person, etc.

For example, when the radio communication system 10 is used for a sensor network, each terminal 100-A to 100-D acquires data output from each sensor such as a seismic sensor and a temperature sensor, and transmits the acquired data to the GW 200 by radio. In this case, each terminal 100-A to 100-D transmits the acquired data to the GW 200 on the occurrence of an event. Such a radio communication system 10 may be referred to as an event-driven radio communication system (or event-driven network).

The present radio communication system 10 is applicable to a radio communication system, in which data is periodically transmitted, and an event-driven radio communication system.

Each terminal 100-A to 100-D is a movable radio communication apparatus, like a feature phone, a smartphone, a personal computer, or the like, for example. Through radio communication with the GW 200, each terminal 100-A to 100-D transmits data to the GW 200, or receive data from the GW 200.

Further, each terminal 100-A to 100-D performs radio communication using a TDMA method. Each terminal 100-A to 100-D shifts to an active mode (or an operating state, which may hereafter be referred to as the "active mode") in a time slot period (which may hereafter be referred to as a "slot") allocated to each self-terminal, to perform radio communication with the GW 200. Also, each terminal 100-A to 100-D becomes a sleep mode (or a power saving mode, which may hereafter be referred to as the "sleep mode") in other than a transmission slot allocated to each self-terminal. As such, each terminal 100-A to 100-D performs operation by repeating the active mode and the sleep mode. Such operation may be referred to as intermittent operation, for example. Because of the intermittent operation in each terminal 100-A to 100-D, power consumption can be reduced in comparison with a case of a continuous active mode.

The GW 200 is a radio communication apparatus for radio communicating with each terminal 100-A to 100-D, as well as a data collection apparatus for collecting data transmitted from each terminal 100-A to 100-D, for example. The GW 200 is also connected to the backbone network. The GW 200 can transmit the collected data to an apparatus connected to the backbone network, or receive data etc. from an apparatus connected to the backbone network. The GW 200 allocates a time slot for data transmission (which may hereafter be referred to as "transmission time slot") to each terminal 100-A to 100-D, to transmit an allocation signal, including allocation information related to the transmission slot, through a broad band. Each terminal 100-A to 100-D receives the allocation signal, to radio communicate with the GW 200 using the transmission slot allocated to the self-terminal, on the basis of the transmission slot included in the allocation information.

Additionally, the example depicted in FIG. 2 illustrates an example including four terminals 100-A to 100-D. However, two or more terminals are sufficient as far as a terminal that performs relay operation is included. Also, the GW 200 may be a movable apparatus, instead of a fixed apparatus.

Each terminal 100-A to 100-D is of the same configuration, and therefore a description may be given as a terminal 100, unless specified otherwise.

<Configuration Example of Terminal 100>

Next, a configuration example of the terminal 100 will be described.

FIG. 3 is a diagram illustrating a configuration example of the terminal 100. The terminal 100 includes a receiver 101, a relay request determinator 102, an intermittent operation controller 103, a data storage 104, a relay request generator 105 and a transmitter 106.

The first transmitter 150-1 in the first embodiment corresponds to the receiver 101, the relay request determinator 102, the intermittent operation controller 103, the data storage 104, the relay request generator 105 and the transmitter 106, for example. Also, the second transmitter 150-2 corresponds to the receiver 101, the relay request determinator 102, the intermittent operation controller 103, the data storage 104, the relay request generator 105 and the transmitter 106, for example.

There are cases that the terminal 100 is a terminal that fails to transmit data to the GW 200 and requests another terminal to relay, and a terminal that, on receipt of a request from another terminal to relay, relays to transmit the data transmitted from the other terminal to the GW 200. Between the above two cases, the terminal 100 may include different data, a signal, etc. to be handled.

For example, when the terminal 100 corresponds to the former case, the terminal 100 generates and transmits a relay request signal, and transmits data (which may hereafter be referred to as "relay data"), which fails in transmission to the GW 200, to the other terminal. Also, when the terminal 100 corresponds to the latter case, the terminal 100, on receiving the relay request signal, generates and transmits a relay permission signal. Further, when the terminal 100 corresponds to the latter case, the terminal 100 receives the relay data from the other terminal, to transmit (or relay) to the GW 200.

The description of FIG. 3 will be given without discrimination of the two cases of the terminal 100, whereas the description of an operation example will be given with discrimination.

The details of the relay request signal, the relay permission signal and an allocation signal will be given later.

The receiver 101 receives the allocation signal transmitted from the GW 200, and the relay request signal, the relay permission signal, the relay data, etc. transmitted from the other terminal. The receiver 101 receives the above signals and the data as radio signals. The receiver 101 converts (downconverts) each radio signal in a radio band into a signal in a base band, and performs decoding processing, error correction decoding processing, etc. on the converted signal. By performing such reception processing, the receiver 101 extracts the allocation signal etc. The receiver 101 outputs the extracted allocation signal, the relay permission signal, the relay data, etc. to the intermittent operation controller 103, and also outputs the relay request signal to the relay request determinator 102.

The relay request determinator 102, on receiving the relay request signal from the receiver 101, determines whether or not the terminal 100 operates as relay terminal (or whether or not the terminal 100 performs relay), and outputs the decision result to the intermittent operation controller 103.

For example, when receiving the relay request signal, the relay request determinator 102 determines that the terminal 100 operates as relay terminal, whereas when not receiving the relay request signal, determines that the terminal 100 does not perform relay operation. Alternatively, the relay request determinator 102, upon receiving the relay request signal, may determine whether or not the terminal 100 operates as relay terminal. In this case, it may also be possible for the relay request determinator 102 to decide to operate as relay terminal if radio quality between the terminal 100 and the GW 200 is satisfactory, whereas to decide not to operate as relay terminal if the radio quality is not satisfactory.

The intermittent operation controller 103, on receiving the allocation signal, for example, extracts allocation information included in the allocation signal, to confirm the period of each transmission slot, allocated to the terminal 100 by the GW 200, and a common slot.

Each transmission slot is a time slot period allocated to the terminal 100 by the GW 200, for example, and a period in which the terminal 100 transmits data to the GW 200. Transmission slots for the terminals 100-A to 100-D, for example, are mutually different periods, to thereby actualize the TDMA method.

Also, the common slot is a time slot period allocated to the terminal 100 by the GW 200, for example, and a period in which the terminal 100 transmits a relay request signal to the GW 200. The common slot is the same period among the terminals 100-A to 100-D. The details of the transmission slots and the common slot will be described later.

The intermittent operation controller 103 stores the information of the transmission slots and the common slot in an internal memory or the like, for example, and outputs each timing signal to the receiver 101 and the transmitter 106 at the start timing and the end timing of each period. According to the timing signals, the receiver 101 and the transmitter 106 switch on or off the power (or to operate or not to operate).

This causes the receiver 101 and the transmitter 106 to become the active mode in each period of the transmission slot allocated to the self-terminal and the common slot, so as to perform reception processing and transmission processing. In other periods, the receiver 101 and the transmitter 106 become the sleep mode and perform neither the reception processing nor the transmission processing. Thus, in each transmission slot and the common slot, it is indicated that the terminal 100 becomes the active mode in the period indicated by these slots, for example.

Further, the intermittent operation controller 103 may output each timing signal to another block such as the relay request determinator 102 and the relay request generator 105. According to the timing signal, each block switches the power on and off (or to operate or not to operate).

This causes each block in the terminal 100 to become the active mode in each period of the transmission slots and the common slot, so as to operate, whereas to become the sleep mode in other periods, so as not to operate. Here, it may also be possible to switch off the power of the receiver 101 and the transmitter 106 in the sleep mode, with the power of the other blocks kept on.

It may also be possible for the intermittent operation controller 103 to start operation with the power switched on from a predetermined period before the start timing of the transmission slots and the common slot, and at the end timing of each period, the power is switched off, for example. The intermittent operation control unit observes each of the timing on the basis of an internal timer, for example.

Further, the intermittent operation controller 103 instructs the transmitter 106 to generate a relay permission signal (for example, a Tpoll signal) on the basis of a relay decision result received from the relay request determinator 102.

For example, the intermittent operation controller 103 instructs the transmitter 106 to generate the relay permission signal, when receiving from the relay request determinator 102 the relay decision result deciding that the terminal 100 is to perform relay. On the other hand, when receiving the relay decision result deciding that the terminal 100 is not to perform relay, the intermittent operation controller 103 does not perform processing in particular.

The relay permission signal is a signal indicating that the terminal 100 permits the use of the self-terminal as relay terminal, for example.

Further, when receiving the relay permission signal from the receiver 101, the intermittent operation controller 103 operates each unit in a manner to become the active mode in a transmission slot period allocated to another terminal, on the basis of the identification information of the other terminal included in the relay permission signal.

Such processing is performed when the terminal 100 transmits relay data to the other terminal, for example. The detail thereof will be described in an operation example.

Further, on receiving the relay data from the receiver 101, the intermittent operation controller 103 outputs the relay data to the transmitter 106. This occurs when the terminal 100 operates as relay terminal, in which the terminal 100 receives the data transmitted from the other terminal, and transmits the data to the GW 200 (or another relay terminal).

The data storage 104 stores data output from another processing unit, for example. The data is, for example, data that the terminal 100 receives from a sensor and transmits to the GW 200.

The relay request generator 105, on receiving from the transmitter 106 a signal indicative of a failure in data transmission to the GW 200, generates a relay request signal and transmits the generated relay request signal to the transmitter 106, for example.

The transmitter 106 performs error correction coding processing, modulation processing, conversion processing into a radio band (or upconversion), etc. on the data read out from the data storage 104, the relay data received from the intermittent operation controller 103, the relay request signal received from the relay request generator 105, etc. Through such transmission processing, the transmitter 106 transmits the data, the relay data, the relay request signal, etc. to the GW 200 and the relay terminal, as radio signals.

Further, the transmitter 106, when directly transmitting the data to the GW 200, determines whether or not data transmission fails. The transmitter 106 performs the determination in the following manner, for example.

Namely, when the transmitter 106 transmits the data to the GW 200, and if the GW 200 normally completes data reception, the GW 200 transmits an ACK (acknowledgement) signal within a certain period. On the other hand, if the GW 200 does not normally complete the data reception, the GW 200 does not transmit the ACK signal. If the receiver 101 fails to receive the ACK signal within the certain period after the data transmission, the transmitter 106 determines that the data transmission to the GW 200 fails. On the other hand, if the receiver 101 successfully receives the ACK signal within the certain period after the data transmission, the transmitter 106 determines that the data transmission to the GW 200 is successful. In such a manner, the transmitter 106 performs the determination by confirming whether or not the ACK signal is successfully received in the reception processing of the receiver 101, for example.

Further, on receiving an instruction to generate a relay permission signal from the intermittent operation controller 103, the transmitter 106 generates and transmits the relay permission signal.

Here, when the terminal 100 moves and enters a radio communicable area of the GW 200, or when the power of the terminal 100 is switched on in the radio communicable area of the GW 200, the terminal 100 transmits a connection request signal to the GW 200. For example, the intermittent operation controller 103 detects that the terminal 100 has moved into the radio communicable area of the GW 200 or the terminal 100 is located in the above area, on the basis of the signal strength etc. of a radio signal received by the receiver 101. Upon such detection, the intermittent operation controller 103 instructs the transmitter 106 to generate the connection request signal. According to the instruction, the transmitter 106 generates the connection request signal to transmit to the GW 200.

<Configuration Example of GW 200>

Next, a configuration example of the GW 200 will be described. FIG. 4 is a diagram illustrating the configuration example of the GW 200. The GW 200 includes a receiver 201, a communication time allocator 202, a data processor 203 and a transmitter 204.

The receiver 201 receives data, relay data, a connection request signal, etc. transmitted from each terminal 100. The receiver 201 receives the above signals as radio signals, and converts (downconverts) each radio signal in a radio band into a signal in a base band, to perform demodulation processing, error correction decoding processing, etc. on the converted signal. Through such reception processing, the receiver 201 extracts the data, the relay data, the connection request signal, etc. The receiver 201 outputs the extracted connection request signal to the communication time allocator 202, and outputs the extracted data and the relay data to the data processor 203, respectively.

On receiving the connection request signal, the communication time allocator 202 allocates a transmission slot to the terminal 100 from which the connection request signal was transmitted. In this case, the communication time allocator 202 allocates a different transmission slot terminal-by-terminal. The communication time allocator 202 generates allocation information related to each transmission slot allocated to the terminal 100, to transmit to the transmitter 204. The allocation information includes the transmission slot allocated to the terminal 100 and a transmission slot allocated to another terminal than the terminal 100 of concern.

Further, the communication time allocator 202 outputs to the transmitter 204 the allocation information inclusive of information related to the common slot. The information related to the common slot is retained in the internal memory of the communication time allocator 202, for example. The communication time allocator 202 includes the information related to the common slot, which is appropriately read out from the internal memory, into the allocation information. By this, information related to the transmission slot and the common slot are included in the allocation information.

The communication time allocator 202 instructs the transmitter 204 to generate a connection response signal responding to the connection request signal, and outputs the generated allocation information to the transmitter 204.

For example, the data processor 203 receives the data and the relay data from the receiver 201, and performs processing such as conversion into a data format that is transmittable to the backbone network, and transmits such data in the converted data format to the backbone network. Also, the data processor 203 receives data transmitted from the backbone network in a predetermined data format, and extracts a data part from the data of the above format to output to the transmitter 204, for example.

The transmitter 204 receives from the communication time allocator 202 allocation information and a generation instruction of a response signal responding to the connection request signal, and generates a connection response signal including the allocation information, to transmit to the terminal 100. Here, in response to the generation instruction of the connection response signal, the transmitter 204 may generate a beacon signal, including the allocation information, to periodically transmit to the terminal 100. In the connection response signal or the beacon signal, information related to the transmission slot allocated to each terminal 100 and the common slot is included, so that the information is transmitted to the terminal 100 as an allocation signal, for example.

Further, the transmitter 204 receives data from the data processor 203, and transmits data destined to the terminal 100 in the transmission slot allocated to the terminal 100 of concern.

The transmitter 204 transmits the connection response signal, the beacon signal, the data, etc. as radio signals. In this case, the transmitter 204 performs error correction coding processing, modulation processing, frequency conversion processing, etc. on the generated connection response signal, etc., to convert (upconverts) into radio band signals and thereby generate the radio signals.

<Operation Example>

Figures 5A, 5B:
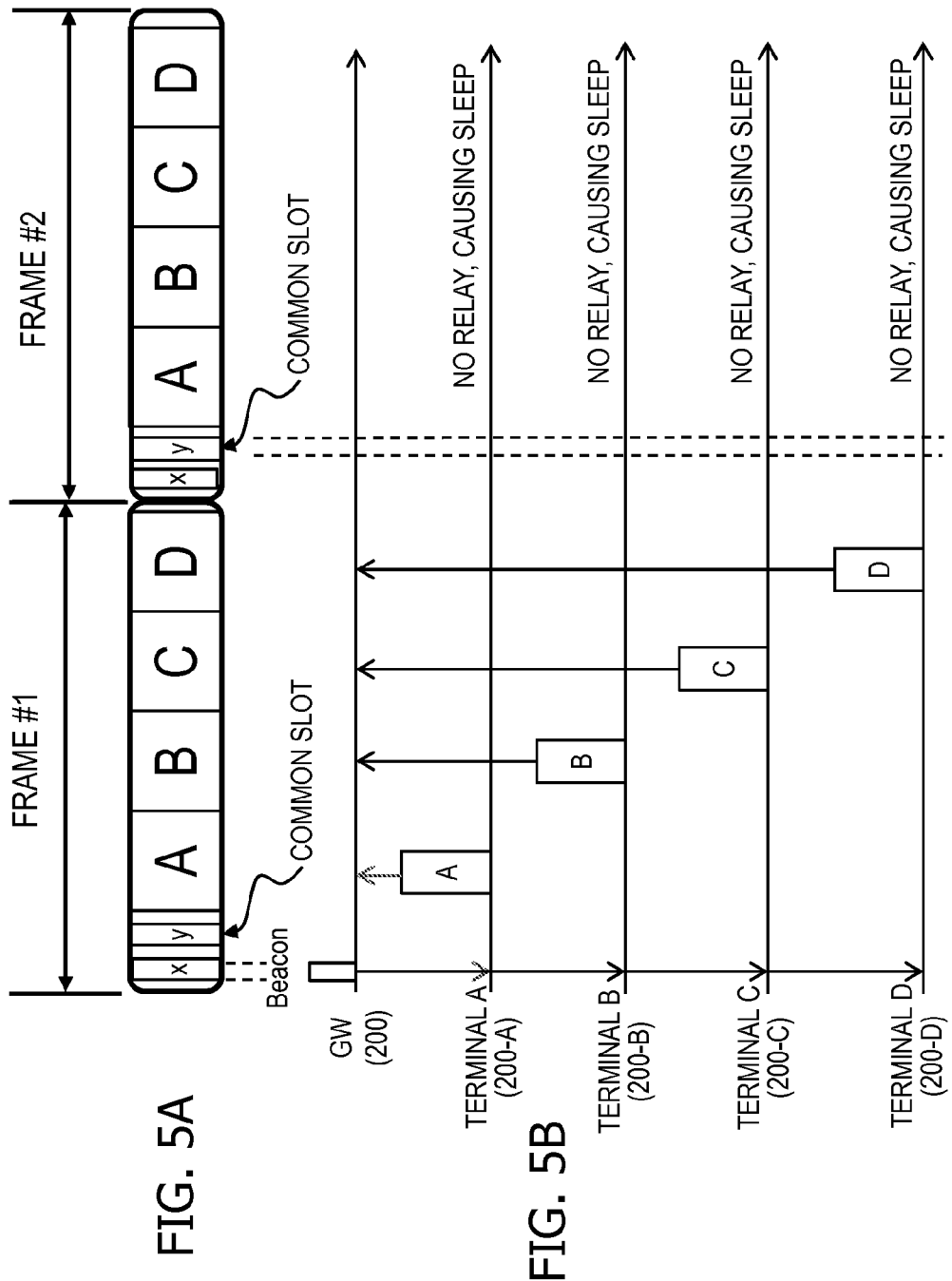
FIG. 5A is a diagram illustrating a configuration example of a frame.
FIG. 5B is a diagram illustrating an operation example in the case of no relay.
Figures 6A, 6B:
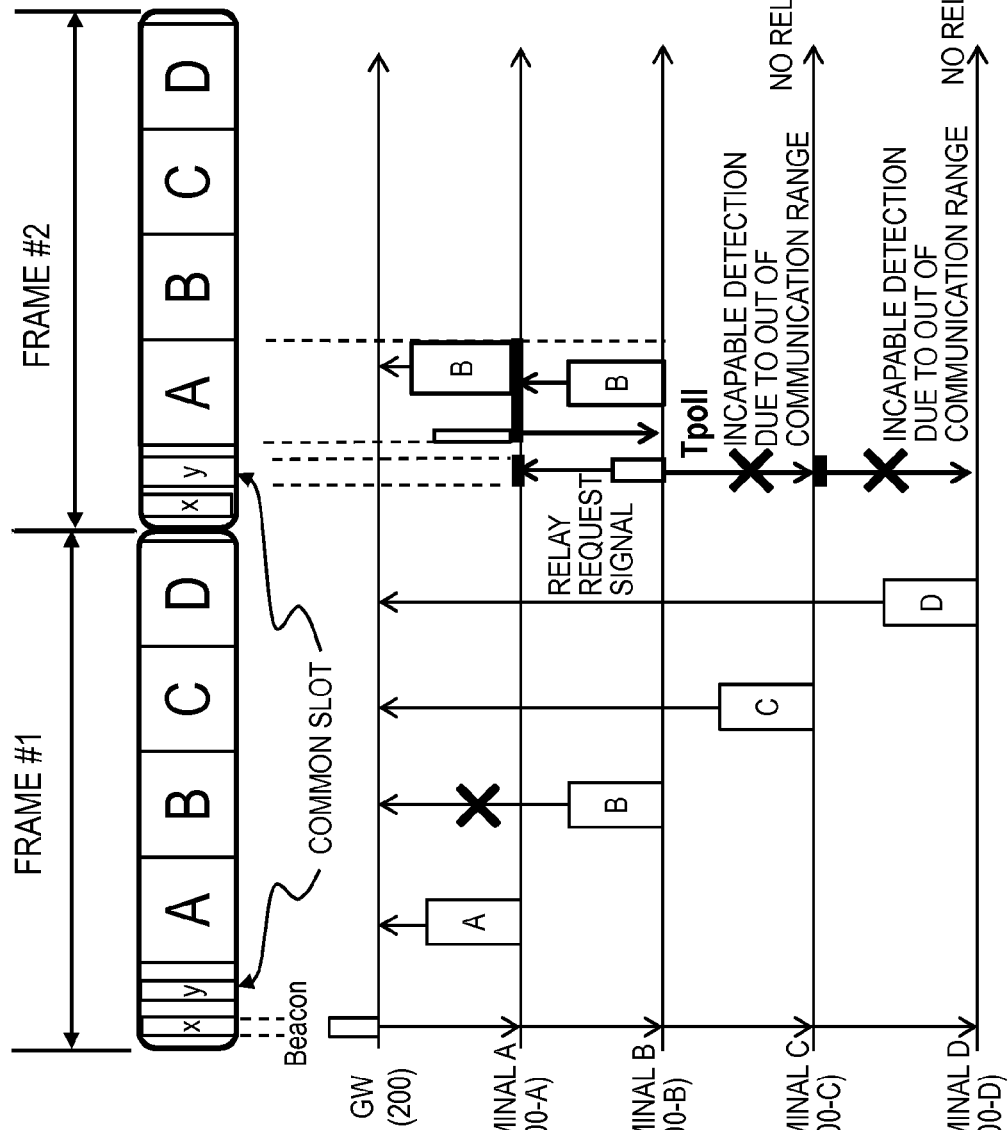
FIG. 6A is a diagram illustrating a configuration example of a frame.
FIG. 6B is a diagram illustrating an operation example when relay is performed.
Figure 7:
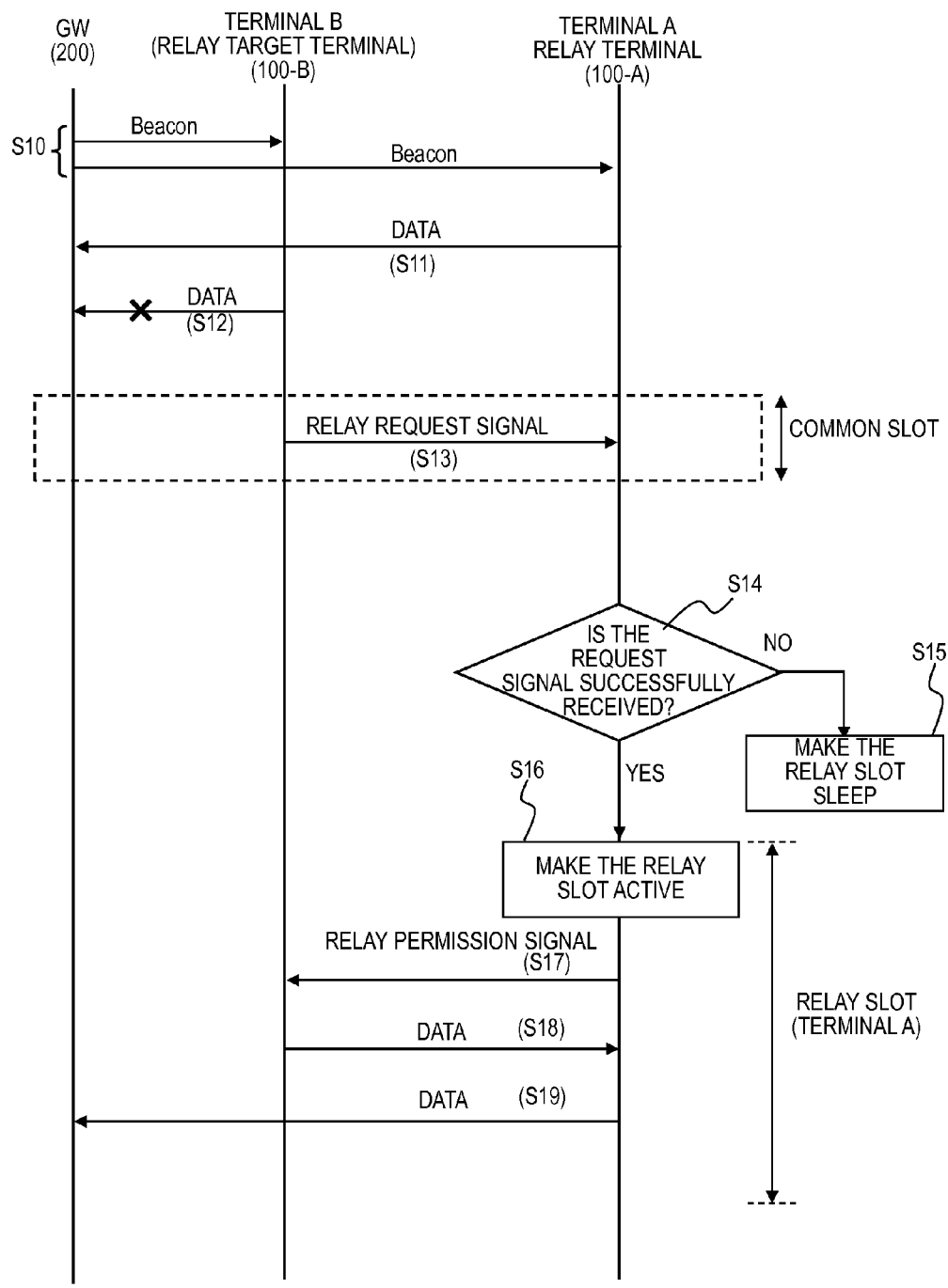
FIG. 7 is a diagram illustrating a sequence example when relay is performed.

Next, an operation example of the radio communication system 10 will be described. FIG. 5A through FIG. 7 are diagrams illustrating operation examples according to the present second embodiment. Among the figures, FIGS. 5A and 5B represent an operation example when relay operation is not performed, whereas FIGS. 6A and 6B represent an operation example when relay operation is performed. Also, FIG. 7 represents a sequence example when the relay operation is performed.

Now, a description will be given on an operation example when the relay operation is not performed. FIG. 5A represents a configuration example of a radio frame (which may hereafter be referred to as "frame"). According to the present second embodiment, the common slot ("y" in FIG. 5A) is provided in each frame. Each terminal 100-A to 100-D, when fails to transmit data to the GW 200, broadcast transmits a relay request signal using the common slot.

Also, the beacon signal is transmitted in a predetermined time slot ("x" in FIG. 5A, which may hereafter be referred to as a "beacon slot") in each frame. Each terminal 100-A to 100-D, on receiving the beacon signal, performs intermittent operation in which the sleep mode and the active mode are repeated according to the allocation information included in the beacon signal.

In the example depicted in FIG. 5A, there is the sequential allocation of a transmission slot ("A" in FIG. 5A) for the terminal 100-A, a transmission slot ("B") for the terminal 100-B, a transmission slot ("C") for the terminal 100-C and a transmission slot ("D") for the terminal 100-D. Each terminal 100-A to 100-D performs radio communication with the GW 200 using each allocated transmission slot, and transmits data, for example.

Here, each terminal 100-A to 100-D may be synchronized with the GW 200 under synchronous control by the beacon signal.

Each terminal 100-A to 100-D becomes the active mode in the beacon slot and the common slot, so as to wait for the reception of the beacon signal and the relay request signal. Further, in a frame after the transmission of data to the GW 200, each terminal 100-A to 100-D becomes the sleep mode even in the transmission slot of the self-terminal because there is no data for transmission. However, if data for transmission occurs in the above case, it may also be possible for each terminal 100-A to 100-D to make active the transmission slot for each self-terminal, so as to transmit the data.

The example depicted in FIG. 5B represents that each terminal 100-A to 100-D is successful in data transmission to the GW 200. In this case, each terminal 100-A to 100-D does not perform relay operation. After the data transmission, the terminal 100-A to 100-D is in the sleep mode even in the transmission slot for each self-terminal.

FIG. 6A represents a configuration example of a frame, and FIG. 6B represents an operation example when relay is performed. In the example depicted in FIG. 6B, there is represented a case that the terminal 100-B fails to transmit data to the GW 200, whereas other terminals 100-A, 100-C and 100-D successfully transmits data.

In this case, the terminal 100-B fails to transmit data in a frame #1, and in a frame #2, transmits a relay request signal using the common slot. On the other hand, the terminals 100-A, 100-C and 100-D wait for receiving a relay request signal in the common slot of each frame.

Here, the terminal 100-B that fails to transmit data to the GW 200 continues in the active mode after transmitting the relay request signal. The reason is to enable the reception of a relay permission signal transmitted from a relay terminal and the transmission of relay data, for example.

In the example depicted in FIG. 6B, a relay request signal transmitted from the terminal 100-B is received in the terminal 100-A, but not received in the terminals 100-C and 100-D. The reason of the terminals 100-C, 100-D incapable of reception is that the terminals 100-C, 100-D are located out of the communicable area of the terminal 100-B, for example.

On receiving the relay request signal, the terminal 100-A decides whether or not the self-terminal becomes a relay terminal. On deciding that the self-terminal becomes the relay terminal, the terminal 100-A switches the transmission slot for the self-terminal to a relay slot, and makes the relay slot active.

For example, in the examples depicted in FIGS. 6A and 6B, "A" in the frame #2 is the relay slot. The terminal 100-A broadcast transmits a relay permission signal using the relay slot. As an example of the relay permission signal, there is a Tpoll signal (or notification signal), for example.

Meanwhile, since the terminal 100-B is in the active mode, the terminal 100-B can receive the relay permission signal transmitted in the relay slot of the terminal 100-A. The terminal 100-B then transmits the relay data to the terminal (which may hereafter be referred to as "relay terminal") 100-A using the relay slot of the terminal 100-A. After transmitting the relay data, the terminal 100-B shifts to the sleep mode.

The reason that the terminal 100-B can transmit the relay data using the relay slot of the relay terminal 100-A is, for example, as follows.

Namely, the terminal 100-A transmits the relay permission signal using the relay slot. Therefore, if the terminal 100-B transmits the relay data to the relay terminal 100-A immediately after receiving the relay permission signal, the terminal 100-B can perform transmission using the transmission slot (or relay slot) allocated to the relay terminal 100-A.

Alternatively, the terminal 100-B retains, in a memory etc., the transmission slot allocated by the beacon signal to another terminal than the self-terminal. The terminal 100-B compares the identification information of the relay terminal 100-A, included in the relay permission signal, with the transmission slot allocated to the other terminal and read out from the memory, so as to confirm the transmission slot allocated to the relay terminal 100-A. Then, the terminal 100-B recognizes that the transmission slot concerned is a relay slot, to thereby transmit the relay data to the relay terminal 100-A using the relay slot. In this case, since the terminal 100-B could recognize the relay slot, the terminal 100-B may transmit the relay data using the relay slots in the next frame (frame #3, for example) and after, not only in the frame (frame #2, for example) concerned.

Then, in the relay slot, the relay terminal 100-A receives the relay data transmitted from the terminal 100-B. The terminal 100-A then transmits the received relay data to the GW 200 using the relay slot concerned.

In the above-mentioned manner, the relay data is transmitted to the GW 200 through the relay terminal 100-A.

In the example depicted in FIG. 6B, the terminals 100-C, 100-D do not receive the relay request signal. In this case, each terminal 100-C, 100-D becomes the active mode in the beacon slot and the common slot, whereas maintains the sleep mode except for a case when either transmission data is generated in the self-terminal or data from the GW 200 destined to each terminal 100-C, 100-D is generated.

FIG. 7 is a sequence diagram illustrating an operation example of relay operation. The operation example depicted in FIG. 7 is a case when the terminal 100-A becomes a relay terminal, and transmits relay data to the GW 200, similar to the case as depicted in FIG. 6B. The terminal 100-B becomes a terminal of a relay target, and the terminal 100-A becomes the relay terminal.

The GW 200 broadcast transmits a beacon signal (S10). For example, the communication time allocator 202 outputs timing (or a period) to transmit the beacon signal and allocation information to the transmitter 204. This enables the transmitter 204 of the GW 200 to transmit the beacon signal, including the allocation information, in a beacon slot (for example, a period "x" depicted in FIG. 6A).

Each terminal 100-A, 100-B receives the beacon signal, and the terminal 100-A transmits data to the GW 200 using the transmission slot allocated to the self-terminal (S11).

For example, the intermittent operation controller 103 in each terminal 100-A, 100-B extracts the allocation information from the beacon signal, to retain information related to the beacon slot, the common slot and the transmission slot allocated to the self-terminal, in an internal memory etc. At the start time and the end time of each slot, the intermittent operation controller 103 outputs timing signals to the receiver 101 and the transmitter 106. By this, the receiver 101 and the transmitter 106 become the active mode in each period of the beacon slot, the common slot and the transmission slot allocated to the self-terminal, so that can receive or transmit the beacon signal, the relay request signal, the data etc.

In the example depicted in FIG. 7, after the terminal 100-A transmits data to the GW 200 (S11), the GW 200, when normally receives the data, transmits an ACK signal to the terminal 100-A.

For example, the receiver 201 of the GW 200, on normally receiving the data, notifies the data processor 203 of the normal reception, and then the data processor 203 instructs to transmit the ACK signal using the transmission slot of the terminal 100-A. Thus, the ACK signal is transmitted.

On the other hand, the terminal 100-B also transmits data using the transmission slot allocated to the self-terminal, whereas fails to transmit the data to the GW 200 (S12).

For example, when the transmitter 106 of the terminal 100-B confirms that an ACK signal is not received in the receiver 101 within a certain period after data is transmitted from the transmitter 106 of the terminal 100-B, the transmitter 106 decides that the data transmission to the GW 200 results in failure.

Next, the terminal 100-B broadcast transmits a relay request signal using the common slot (S13).

For example, in the common slot, the transmitter 106 of the terminal 100-B transmits the relay request signal received from the relay request generator 105. In this case, the relay request generator 105 may generate a relay request signal that includes the identification information of the self-terminal 100-B, or may generate a relay request signal that does not include the identification information concerned.

Next, the terminal 100-A determines whether or not the relay request signal is successfully received in the common slot (S14).

For example, when receiving from the receiver 101 the relay request signal in the common slot, the relay request determinator 102 of the terminal 100-A determines that the reception of the relay request signal is successful. On the other hand, if the relay request signal from the receiver 101 is not received in the common slot, the relay request determinator 102 determines that the reception of the relay request signal is unsuccessful. The relay request determinator 102 then outputs the relay decision result to the intermittent operation controller 103.

If the reception of the relay request signal is not successful (No in S14), the terminal 100-A makes the relay slot sleep (S15).

For example, when the reception of the relay request signal in the common slot fails, the relay request determinator 102 of the terminal 100-A determines not to perform relay, and outputs the above decision result to the intermittent operation controller 103. The intermittent operation controller 103 does not transmit timing signals to the receiver 101 and the transmitter 106 even when the transmission slot (or the relay slot) allocated to the terminal 100-A comes. This causes the receiver 101 and the transmitter 106 not to be power on in the transmission slot, to thereby enable the relay slot to sleep. For the next frame and thereafter, the terminal 100-A shifts to S10, and repeats the above-mentioned processing.

Meanwhile, when the terminal 100-A successfully receives the relay request signal (Yes in S14), the terminal 100-A determines that the self-terminal becomes a relay terminal, so as to make the relay slot active (S16).

For example, on receiving the relay request signal in the common slot, the relay request determinator 102 of the terminal 100-A determines that the self-terminal becomes the relay terminal, and outputs the above decision result to the intermittent operation controller 103. On receiving the decision result, the intermittent operation controller 103 outputs timing signals to the receiver 101 and the transmitter 106, at the start time and the end time of the transmission slot allocated to the terminal 100-A. By this, in the receiver 101 and the transmitter 106, power is switched on in the relay slot, to enable the relay slot to be active.

Next, in the relay slot, the terminal 100-A broadcast transmits a relay permission signal (for example, Tpoll) (S17).

For example, the intermittent operation controller 103 of the terminal 100-A instructs the transmitter 106 to generate a relay permission signal including the identification information of the self-terminal. By this, the transmitter 106 generates the relay permission signal including the identification information of the terminal 100-A, and transmits the relay permission signal in the relay slot.

Next, the terminal 100-B receives the relay permission signal, and transmits relay data to the terminal 100-A (S18).

For example, the intermittent operation controller 103 of the terminal 100-B, on receiving the relay permission signal from the receiver 101, extracts the identification information of the terminal 100-A included in the relay permission signal. Based on the extracted identification information, the intermittent operation controller 103 instructs the transmitter 106 to transmit the relay data to the relay terminal 100-A. According to the instruction, the transmitter 106 reads out the relay data from the data storage 104, and transmits the relay data to the relay terminal 100-A.

The terminal 100-A, on receiving the relay data from the terminal 100-B, transmits the relay data to the GW 200 (S19).

For example, the intermittent operation controller 103 of the terminal 100-A outputs the relay data received from the receiver 101 to the transmitter 106, and instructs the transmitter 106 to transmit the relay data to the GW 200. Based on the instruction, the transmitter 106 transmits the relay data to the GW 200.

Thus, the relay data transmitted from the terminal 100-B is transmitted through the terminal 100-A to the GW 200. Then, after the lapse of the relay slot period, the intermittent operation controller 103 of the relay terminal 100-A outputs a timing signal indicating that the relay slot is completed to the receiver 101, the transmitter 106, etc., and then shifts to the sleep mode.

As such, according to the present second embodiment, with the provision of the common slot in each frame, the terminal 100-B that fails to transmit data issues a relay request to other terminals 100-A, 100-C and 100-D using the common slot. By the use of the common slot, the terminal 100-A, on receiving the relay request signal, becomes a relay terminal, to enable data relay using the transmission slot of the self-terminal.

In this case, the GW 200 is not configured to detect whether the terminal 100-B fails to transmit data or does not transmit the data. Without such detection in the GW 200, each terminal 100-A to 100-D is configured to use the common slot when requesting relay, to perform relay between each terminal 100-A to 100-D.

Thus, the data relay can be performed in the radio communication system 10 if the GW 200 is unable to detect whether each terminal 100-A to 100-D fails to transmit data or does not transmit the data.

Further, as depicted in FIG. 6B etc., each terminal 100-C, 100-D that is not involved in the relay operation becomes the sleep mode, not the active mode, in the transmission slot (or the relay slot) allocated to each self-terminal after completing the data transmission in the self-terminal. Accordingly, power consumption in each terminal 100-C, 100-D can be reduced, in comparison with a case when the terminal 100-C, 100-D becomes the active mode in the transmission slot after the completion of the data transmission.

Further, after the completion of the relay operation, each terminal 100-A, 100-B also maintains the sleep mode in the transmission slot (or the relay slot) of the self-terminal, without in the active mode. Accordingly, also in each terminal 100-A, 100-B, power consumption can be reduced, in comparison with a case when the terminal 100-A, 100-B becomes the active mode in the transmission slot allocated to each self-terminal after the completion of the relay operation.

The above-mentioned example describes a configuration example of a frame that includes the beacon slot, the common slot, and also the transmission slot for each terminal 100-A to 100-D. As another example of the frame configuration, it may also be possible that the first half part of one frame is a section for direct transmission to the GW 200 and the second half part is a section for relay communication, for example.

Figures 8A, 8B:
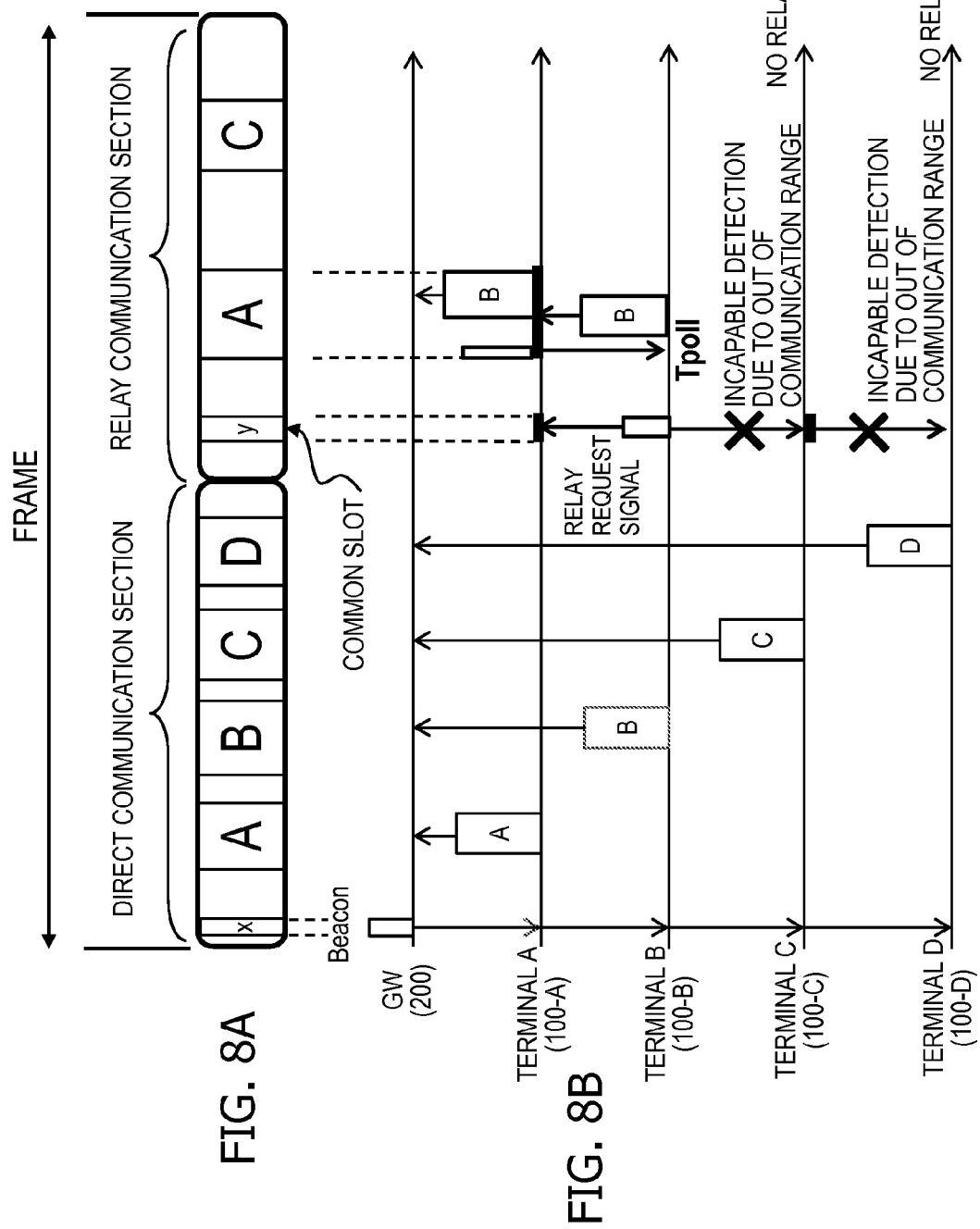
FIG. 8A is a diagram illustrating a configuration example of a frame.
FIG. 8B is a diagram illustrating an operation example when relay is performed.

FIG. 8A is a diagram illustrating such a frame configuration, and FIG. 8B is a diagram illustrating an example of relay operation.

As depicted in FIG. 8A, the direct communication section and the relay communication section are included in one frame. The direct communication section includes a beacon slot and transmission slots. Each terminal 100-A to 100-D performs direct data transmission to the GW 200, using each transmission slot allocated by the GW 200.

On the other hand, the relay communication section includes the common slot and relay slots. Each terminal 100-A to 100-D transmits relay data to the GW 200 using each relay slot allocated by the GW 200. In this case, the common slot is commonly used by all terminals 100-A to 100-D, similar to the examples described above.

In the example depicted in FIG. 8B, relay slots ("A" and "C") are allocated to the two terminals 100-A, 100-C. Such allocation of the relay slots to the two terminals 100-A, 100-C is obtained from the measurement of radio quality of each terminal 100-A to 100-D in the GW 200, and as a result, a decision that the radio quality of the two terminals 100-A, 100-C is satisfactory. The reason is that, when the radio quality is satisfactory, the possibility of relay data transmission to the GW 200 becomes higher than a case when the radio quality is unsatisfactory. Here, the GW 200 may also allocate relay slots to all terminals 100-A to 100-D, for example.

The allocation of the relay slots is performed in the following manner, for example. Namely, the receiver 201 of the GW 200 measures radio quality from each SNR (Signal to Noise Ratio), SINR (Signal to Interference and Noise Ratio), etc. of a radio signal transmitted from each terminal 100-A to 100-D, and outputs the measurement result to the communication time allocator 202. Based on the measurement result for each terminal 100-A to 100-D, the communication time allocator 202 allocates a relay time slot to a terminal that produces a measurement result higher than and including a communication threshold.

Here, in the example of the relay operation depicted in FIG. 8B, similar to the aforementioned case, the terminal 100-B transmits a relay request signal using the common slot. Then, the terminal 100-A (relay terminal), on receiving the relay request signal, transmits relay data using the relay slot allocated to the self-terminal.

With such a frame configuration also, the relay operation can be performed if the GW 200 is unable to detect whether each terminal 100-A to 100-D fails to transmit data or does not transmit the data, similar to the examples described above.

Also, each terminal 100-C, 100-D, which does not perform relay operation, is in the sleep mode even in a case when each relay slot is allocated thereto. Therefore, power consumption can be reduced in comparison with a case when each terminal 100-C, 100-D becomes the active mode in the relay slot.

Further, after completing the relay operation, each terminal 100-A, 100-B maintains the sleep mode in the relay slot of each self-terminal, without becoming the active mode. Therefore, power consumption can be reduced in comparison with a case when the terminal 100-A, 100-B becomes the active mode in the relay slot of each self-terminal even after the completion of the relay operation.

Third Embodiment

Next, a third embodiment will be described. The present third embodiment is a case when a plurality of terminals 100 transmit relay request signals using the common slot, for example. FIGS. 9A through 11 are diagrams illustrating an operation example etc. according to the third embodiment.

FIG. 9A is a diagram illustrating a configuration example of a frame, and FIG. 9B is a diagram illustrating an example of relay operation. As depicted in FIGS. 9A, 9B, two terminals 100-B, 100-C fail to transmit data to a GW 200 in a frame #1.

The two terminals 100-B, 100-C transmit the relay request signals using the same common slot. The terminal 100-A receives the relay request signals from the two terminals 100-B, 100-C.

When the relay request signals include the identification information of each terminal 100-B, 100-C, it is not possible for the terminal 100-A to identify the identification information, because the terminal 100-A receives crosstalk relay request signals, for example. Therefore, the terminal 100-A is unable to determine a terminal that transmits a relay request signal.

However, the terminal 100-A can receive a signal of a certain level or higher. If the terminal 100-A is unable to identify a terminal 100 that transmits the relay request signal, it is possible to detect the reception of signal of the certain level or higher in the common slot. In this case, on the assumption that a relay request signal is received, the terminal 100-A makes the relay slot of the terminal 100-A active. This enables the terminal 100-A to prepare for the reception and transmission of relay data, as a relay terminal. The reason for the use of the signal of the certain level or higher is because there may be a case when the terminal 100-A receives a noise signal or the like.

In the example depicted in FIG. 9B, the terminal 100-A relays the relay data of the terminal 100-B in the relay slot of a frame #2, and also relays the relay data of the terminal 100-C in the relay slot of a frame #3.

Here, the terminal 100-D is successful in the direct transmission of data to the GW 200, and does not receive a relay request signal. In such a case, the terminal 100-D maintains the sleep mode even in an allocated transmission slot (or relay slot) in the frames after the frame #2.

Figure 10:
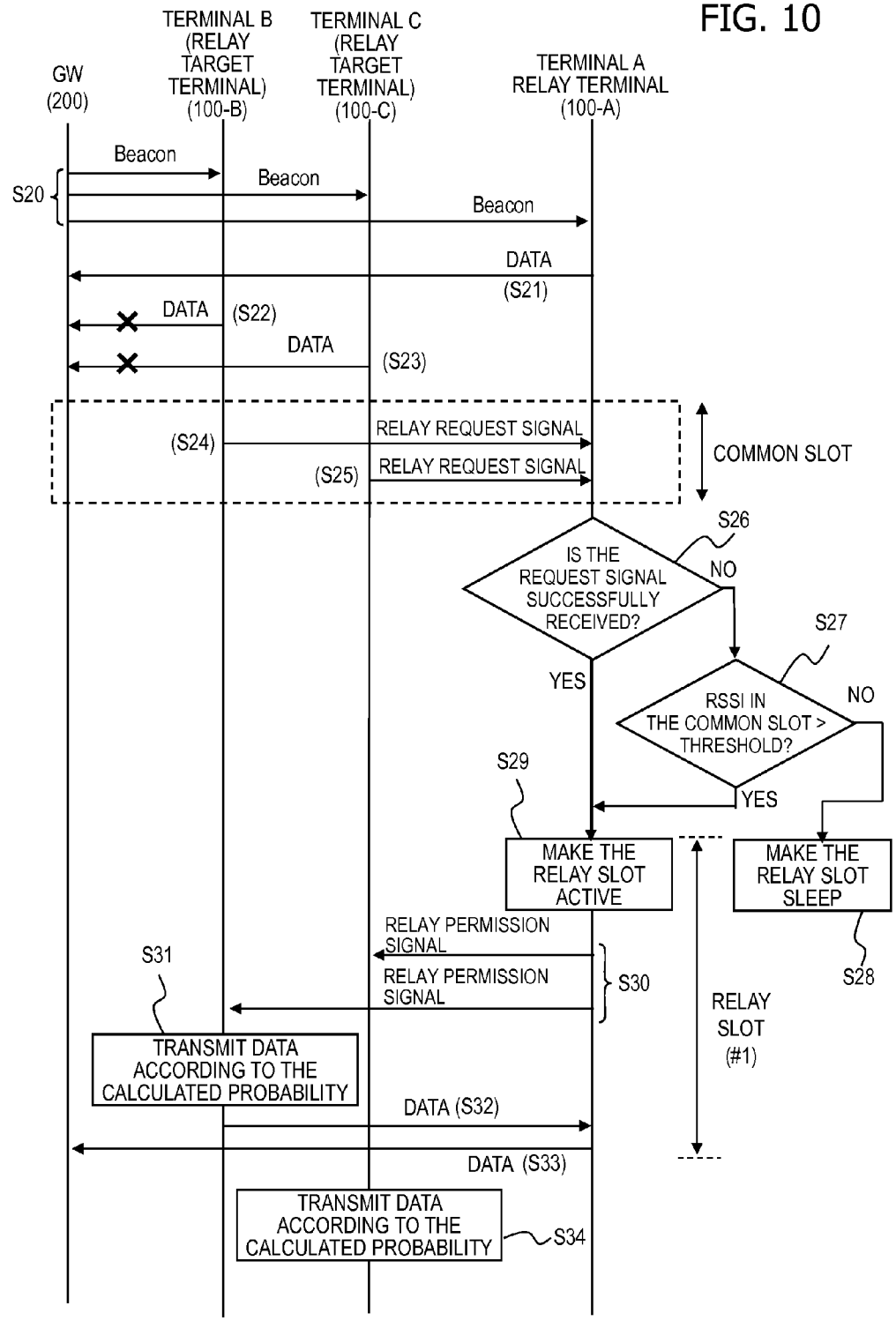
FIG. 10 is a diagram illustrating a sequence example when relay is performed.

FIG. 10 is a sequence diagram representing an operation example according to the third embodiment. FIG. 10 is an example similar to FIG. 9B, in which each terminal 100-B, 100-C is a relay target terminal, and the terminal 100-A is a relay terminal.

The GW 200 broadcast transmits a beacon signal using a beacon slot (S20). Each terminal 100-A to 100-C receives the beacon signal to grasp each transmission slot allocated to each self-terminal.

Next, the terminal 100-A transmits data using a transmission slot allocated to the self-terminal (S21). By the reception of an ACK signal indicative of normal reception from the GW 200, the terminal 100-A successfully transmits the data.

On the other hand, the terminal 100-B transmits data to the GW 200 using a transmission slot allocated to the self-terminal, which results in failure (S22). Also, the terminal 100-C transmits data to the GW 200 using a transmission slot allocated to the self-terminal, which results in failure (S23). For example, when each terminal 100-B, 100-C fails to receive from the GW 200 an ACK signal in response to the data transmission within a certain period, the terminal 100-B, 100-C determines that the data transmission results in failure.

Next, the terminal 100-B broadcast transmits a relay request signal using the common slot (S24). Also, the terminal 100-C broadcast transmits a relay request signal using the same common slot (S25).

Next, the terminal 100-A determines whether or not the reception of the relay request signal in the common slot is successful (S26). The determination of whether the reception of the relay request signal is successful is performed in the following manner, for example.

Namely, when the relay request determinator 102 of the terminal 100-A receives a signal from the receiver 101 in a common slot period, and could confirm that the signal concerned is a relay request signal, the relay request determinator 102 determines that the reception of the relay request signal is successful. On the other hand, when the relay request determinator 102 does not receive a signal from the receiver 101 in the common slot period, or when fails to confirm the received signal to be a relay request signal, the relay request determinator 102 determines that the reception of the relay request signal is unsuccessful.

When the reception of the relay request signal is unsuccessful (No in S26), the terminal 100-A measures RSSI (Received Signal Strength Indicator) in the common slot, to determine whether or not the measured RSSI is higher than a threshold (S27).

For example, there may be cases that, though the reception of the signal can be confirmed, the terminal 100-A fails to extract information included in a signal, or though the reception of a preamble can be confirmed, the terminal 100-A fails to read a signal subsequent thereto. The signal concerned may be the relay request signal or may be a noise signal, depending on cases.

Accordingly, the terminal 100-A measures the reception signal strength of the received signal in the common slot, and if the measured reception signal strength is a signal level threshold or higher, the terminal 100-A decides that the signal concerned is a relay request signal, so as to determine to perform relay. The terminal 100-A then makes the relay slot of the self-terminal active (Yes in S27, and S29).

On the other hand, if the measured reception signal strength is lower than the signal level threshold, the terminal 100-A determines not to perform relay, and makes the relay slot sleep (No in S27, and S28). In this case, for the next frame and after, the terminal 100-A shifts to S20 to repeat the above-mentioned processing.

As such, according to the present third embodiment, the terminal 100-A determines to perform relay if the reception signal strength is the signal level threshold or higher, and performs relay operation if the terminal 100-A fails to correctly receive the relay request signal.

When the terminal 100-A successfully receives the relay request signal (Yes in S26), the terminal 100-A also makes the relay slot active (S29).

After making the relay slot active, the terminal 100-A broadcast transmits a relay permission signal (for example, Tpoll signal) using the relay slot (S30). For example, the relay permission signal includes the identification information of the terminal 100-A.

Both terminals 100-B, 100-C receive the broadcast transmitted relay permission signal. In this case, if both terminals 100-B, 100-C transmit relay data using the same relay slot, the relay terminal 100-A is unable to normally receive the two relay data.

Therefore, according to the present third embodiment, each terminal 100-B, 100-C, on receiving the relay permission signal, transmits the relay data according to the calculated probability, using the relay slot. For example, the terminal 100-B, on receiving the relay permission signal, transmits the relay data using the relay slot in the frame concerned, according to the probability of "1/2". Alternatively, on receiving the relay permission signal, the terminal 100-C transmits the relay data using the relay slot in the frame according to the probability of "1/3". In the example depicted in FIG. 10, according to such calculated probability, the terminal 100-B transmits the relay data using the relay slot (S31-S33), whereas the terminal 100-C does not transmit the relay data using the relay slot (S34).

Such probability is calculated in the following manner, for example. Namely, the intermittent operation controller 103, on receiving the relay permission signal from the receiver 101, reads out a probability value (for example, "1/2", "1/3", etc.) retained in an internal memory etc., to determine whether or not to perform relay data transmission using the relay slot in the frame concerned. When determining to transmit the relay data, the intermittent operation controller 103 outputs an instruction to transmit relay data to the transmitter unit 106. On the other hand, when determining not to transmit the relay data, the intermittent operation controller 103 does not particularly perform processing to instruct the transmitter 106.

Figure 11:
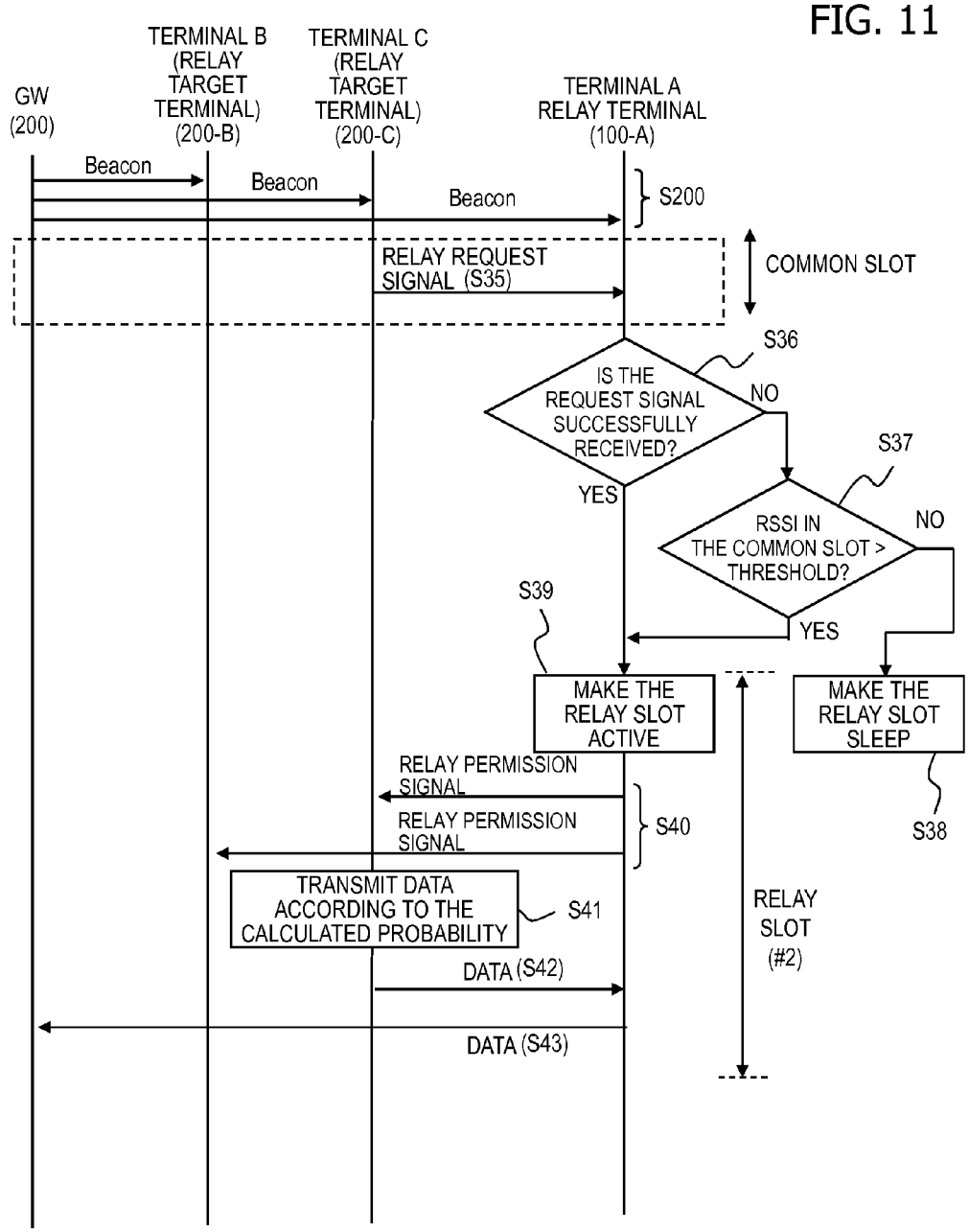
FIG. 11 is a diagram illustrating a sequence example when relay is performed.

In the example depicted in FIG. 10, the terminal 100-C not transmitting the relay data receives a beacon signal in the next frame (frame #2) (S200 in FIG. 11). Thereafter, the terminal 100-C transmits a relay request signal using the common slot (S35 in FIG. 11).

If the terminal 100-A successfully receives the relay request signal (Yes in S36), the terminal 100-A makes the relay slot active (S39) to transmit a relay permission signal (S40). The terminal 100-C, on receiving the relay permission signal, determines again whether or not to transmit relay data according to calculated probability. In the example depicted in FIG. 11, the terminal 100-C transmits the relay data using the relay slot in the frame concerned (frame #2) (S41-S43).

When the terminal 100-A fails to receive a correct relay request signal (No in S36), the terminal 100-A either makes the relay slot active or sleep on the basis of the reception signal strength, similarly to the above-mentioned example (S37-S39). When the terminal 100-A makes the relay slot sleep, the terminal 100-A shifts to S20 or S200 to repeat the above-mentioned processing for the next frame and thereafter.

In the present third embodiment also, the relay operation can be performed if the GW 200 is unable to detect whether each terminal 100-A to 100-D fails to transmit the data or does not transmit the data.

Further, the terminal 100-D not performing relay operation is in the sleep mode even when the transmission slot (or the relay slot) is allocated thereto. Accordingly, power consumption can be reduced in comparison with a case when the terminal 100-D becomes the active mode in the relay slot. Moreover, each terminal 100-A to 100-C, after the completion of the relay operation, maintains the sleep mode in the transmission slot (or the relay slot) of each self-terminal. Accordingly, power consumption can be reduced in comparison with a case when the terminal 100-A to 100-C becomes the active mode in the transmission slot.

Also, in the present radio communication system 10, if a plurality of relay request signals are transmitted in the common slot, relay operation is performed through a relay terminal if the reception signal strength is a signal level threshold or higher. In this case, because each terminal 100-A to 100-D determines whether or not to transmit relay data according to probability, it is possible to prevent data crosstalk in the relay terminal, with increased probability of relay data transmission to the GW 200 to a certain value or greater.

In the present third embodiment, it is determined whether to make the relay slot active or sleep, on the basis of RSSI (for example, S27 in FIG. 10). However, it may also be possible to use another index than RSSI that represents a reception signal level, such as the values of reception power, SNR and SINR.

Also, it is determined whether or not to transmit data in the frame according to the probability calculated in each terminal 100-B, 100-C (for example, S31, S34 in FIG. 10). In regard to the above probability, probability calculation may be performed based on radio quality of the GW 200 and another terminal 100, relay history information performed in the past, and the like, for example. Such probability calculation is performed based on the history information stored in the internal memory etc. by the intermittent operation controller 103 and the receiver 101, for example.

Fourth Embodiment

Next, a fourth embodiment will be described. In the second embodiment, it is described that the terminal 100-B that fails to transmit data transmits a relay request signal, and the terminal 100-A receives the relay request signal.

For example, when the number of terminals 100 in a certain area is a certain value or larger, there is a case that a plurality of terminals that receive the relay request signal make the relay slot active to wait for the reception of relay data. In this case, a terminal, which does not actually relay the relay data, makes the relay slot active despite that the terminal does not relay the relay data. This causes wasteful power consumption in the relay slot period.

In consideration thereof, according to the present fourth embodiment, the terminal 100-B that fails to transmit data to the GW 200 transmits a relay request signal that includes the number of available relay terminals. Each terminal 100-A, 100-C, 100-D, on receiving the relay request signal, calculates probability to make the relay slot active on the basis of the number of available relay terminals, and makes the relay slot active according to the calculated probability.

Here, the number of available relay terminals represents the number of terminals that can be used by the terminal 100-B as relay terminals, for example.

If each terminal 100-A, 100-C, 100-D makes a relay slot active according to the probability, another relay slot may be made sleep. In such a case, in comparison with a case that a plurality of terminals 100-A, 100-C and 100-D that receive the relay request signal make the relay slots active, it is possible to reduce power consumption in each terminal that receives the relay request signal.

Figure 12:
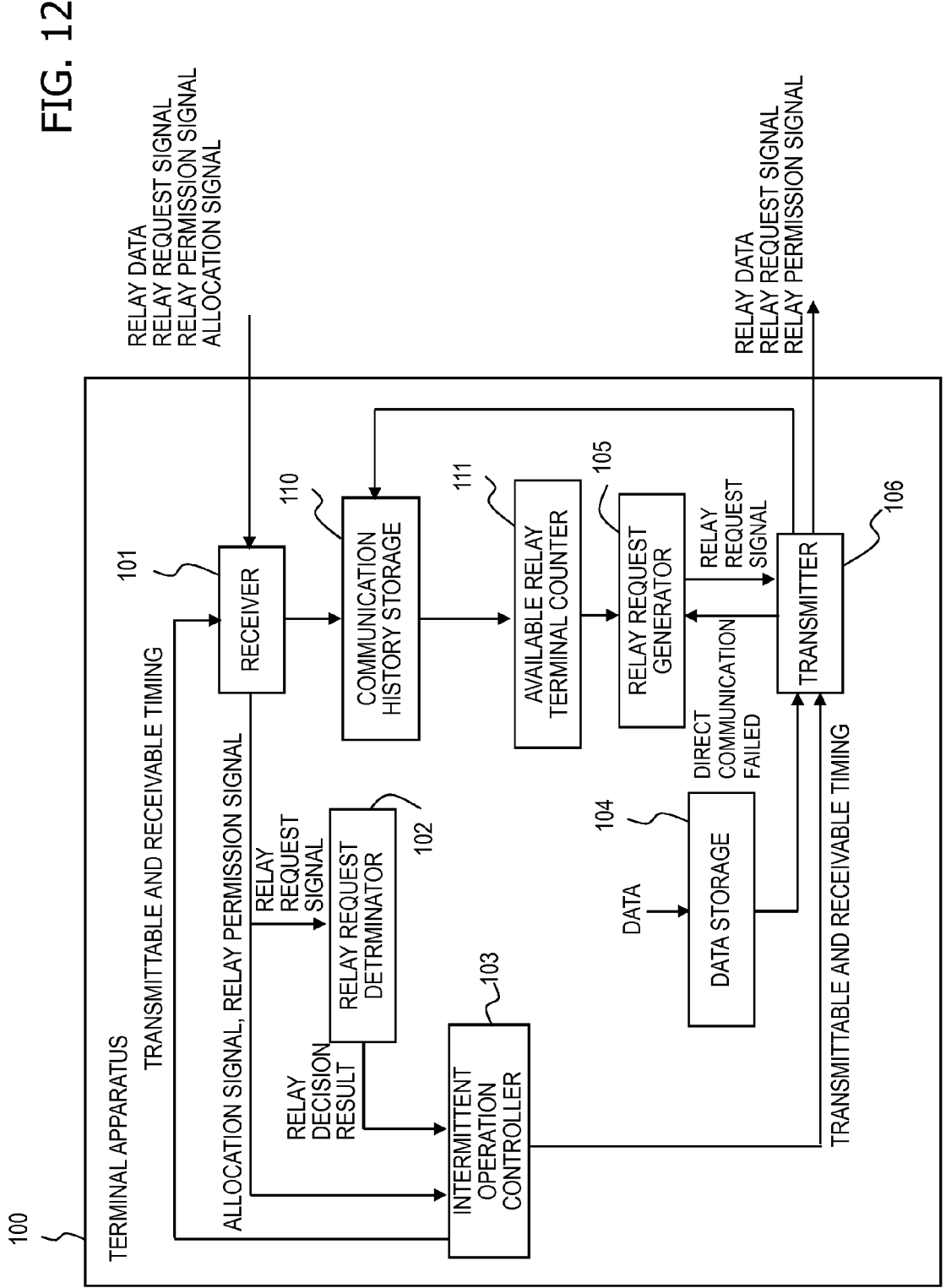
FIG. 12 is a diagram illustrating a configuration example of a terminal.

FIG. 12 is a diagram illustrating a configuration example of the terminal 100 according to the fourth embodiment. The terminal 100 further includes a communication history storage 110 and an available relay terminal counter 111.

The communication history storage 110 receives a relay permission signal from the receiver 101, and also receives relay data from the transmitter 106, for example. Then, based on the relay permission signal and the relay data, the communication history storage 110 stores the number of times of relay data transmission on a terminal-by-terminal basis. The communication history storage 110 stores the number of times of relay data transmission of each terminal, as history information, for example.

The available relay terminal counter 111 calculates the number of available relay terminals on the basis of the history information read out from the communication history storage 110. For example, the available relay terminal counter 111 reads out the number of times of relay data transmission terminal-by-terminal, extracts each terminal having the number of transmission times larger than a threshold, to determine the number of extracted terminals to be the number of available relay terminals. The number of available relay terminals is output to the relay request generator 105, so that a relay request signal that includes the number of available relay terminals is generated in the relay request generator 105.

Figure 13:
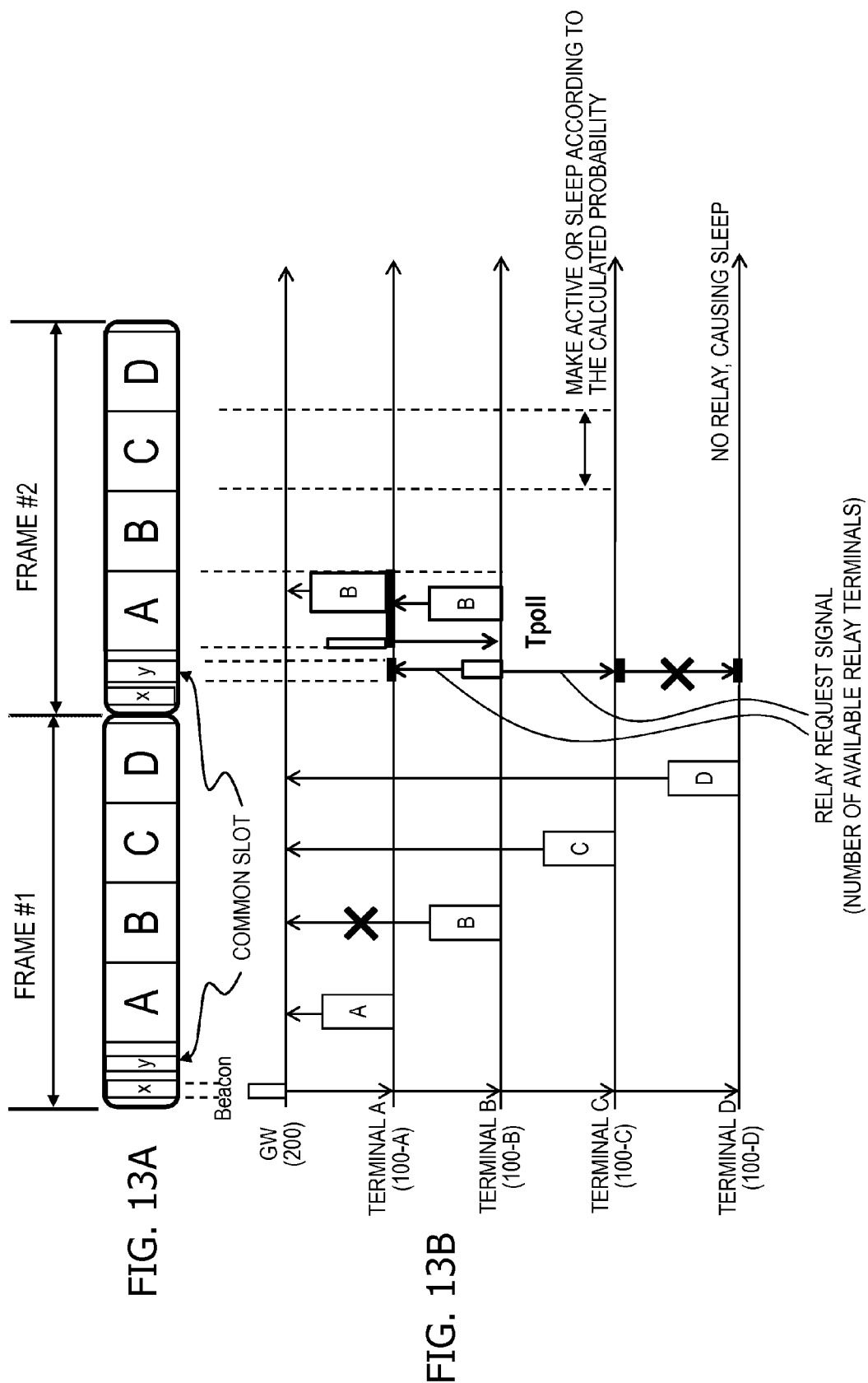
FIG. 13A is a diagram illustrating a configuration example of a frame.
FIG. 13B is a diagram illustrating an operation example when relay is performed.

FIG. 13A is a diagram illustrating a configuration example of a frame, and FIG. 13B is a diagram illustrating an example of relay operation. In the example depicted in FIG. 13B, the terminal 100-B fails to transmit data to the GW 200, whereas the other terminals 100-A, 100-C and 100-D successfully transmit data to the GW 200. For example, based on the history information performed between with the terminals 100-A, 100-C and 100-D, the terminal 100-B calculates the number of available relay terminals to be "3". In this case, the terminal 100-B transmits a relay request signal including "3", that is, the number of available relay terminals.

Here, in the example of FIG. 13B, there is illustrated a case when the terminal 100-D fails to receive the relay request signal transmitted from the terminal 100-B.

Each terminal 100-A, 100-C, on receiving the relay request signal, calculates the probability to set the relay slot to the active mode, to make the relay slot active accordingly. For example, the probability to make the relay slot active may be set to "1/3" when the number of available relay terminals is "3".

Because the probability to make the relay slot active is based on the number of available relay terminals, for example, if the number of available relay terminals is "10", "100", etc., the probability comes to "1/10", "1/100", etc. As such, the probability decreases as the number of available relay terminals increases.

Thus, in the radio communication system 10 according to the present fourth embodiment, power consumption in the relay terminal 100 is reduced while relay is performed by the relay terminal 100.

Here, the calculation of probability whether to make the relay slot active or sleep may be implemented in the second embodiment also. In this case, the relay terminal 100-A, on receiving a relay request signal from the single terminal 100-B, may read out a probability value retained in the internal memory to determine whether to make the relay slot of the self-terminal active or sleep, for example.

Figure 14:
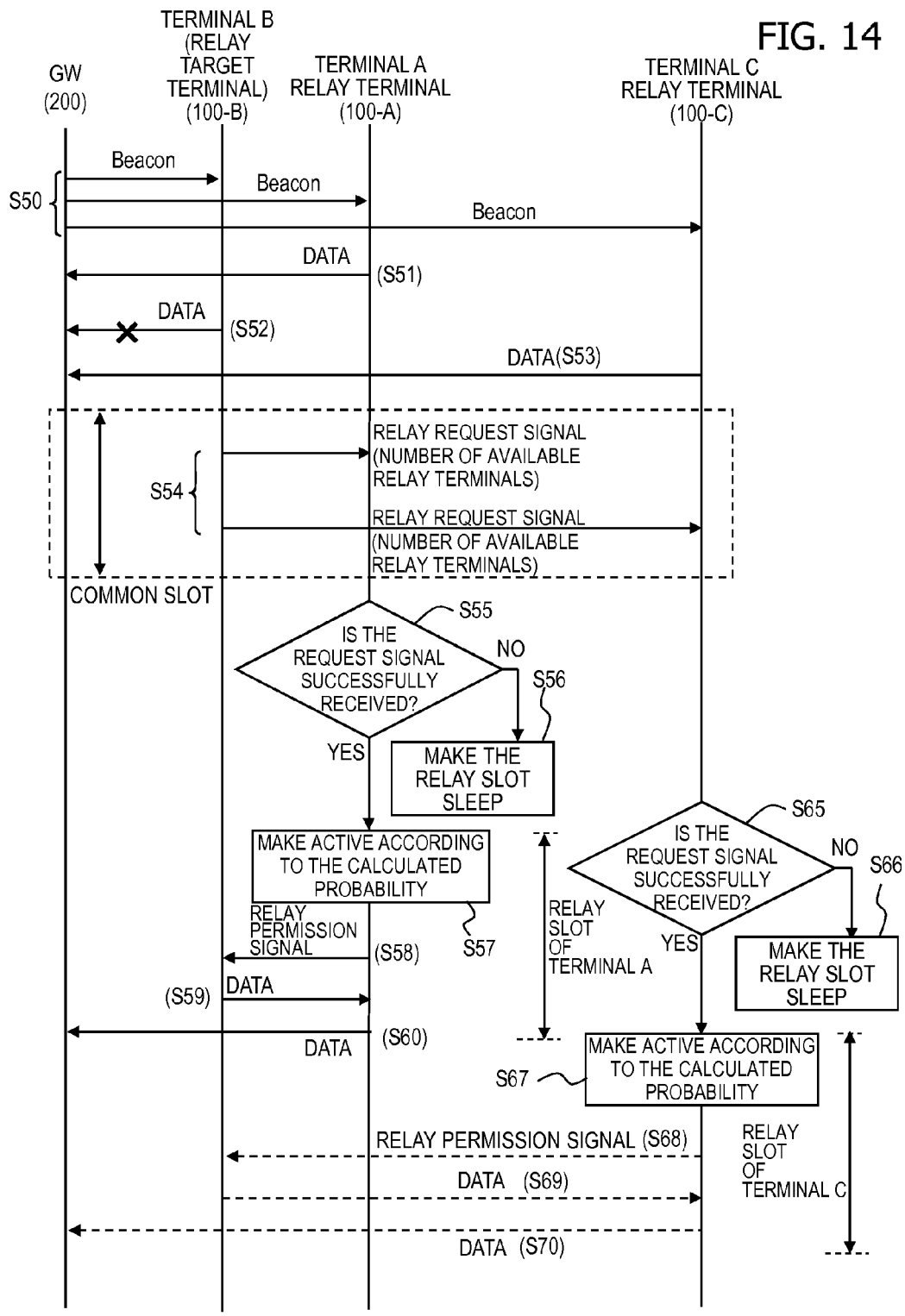
FIG. 14 is a diagram illustrating a sequence example when relay is performed.

FIG. 14 is a sequence diagram representing an operation example according to the present fourth embodiment. FIG. 14 is an example similar to FIG. 13B, in which the terminal 100-B is a relay target terminal, and each terminal 100-A, 100-C is a relay terminal.

The GW 200 transmits a beacon signal (S50). Each terminal 100-A to 100-C transmits data to the GW 200 using each transmission slot allocated to each self-terminal (S51-S53). In this example, the terminal 100-B fails to transmit data.

The terminal 100-B generates a relay request signal that includes the number of available relay terminals, and transmits the relay request signal using the common slot (S54).

The terminal 100-A, on determining that the relay request signal is successfully received in the common slot (Yes in S55), calculates probability to make the relay slot active, on the basis of the number of available relay terminals extracted from the relay request signal. The terminal 100-A then makes the relay slot active according to the calculated probability (S57).

For example, the following processing is performed. Namely, on receiving the relay request signal in the common slot from the receiver 101, the relay request determinator 102 determines to perform relay. The relay request determinator 102 then extracts the number of available relay terminals from the relay request signal, to calculate probability to make the relay slot active on the basis of the extracted number of available relay terminals. According to the calculated probability, the relay request determinator 102 determines whether or not to make the relay slot active. The relay request determinator 102 obtains a decision result whether to make the relay slot active (or to perform relay) or sleep (or not to perform relay), to output to the intermittent operation controller 103. When the intermittent operation controller 103 obtains a decision result that the relay slot is to be made active, the intermittent operation controller 103 outputs a timing signal to the receiver 101 and the transmitter 106, at the start timing or the end timing of the relay slot. This causes the relay slot to be active. On the other hand, when the relay request determinator 102 obtains a decision result that the relay slot is to be made sleep, the relay request determinator 102 does not perform processing in particular.

In the example depicted in FIG. 14, the terminal 100-A makes the relay slot active according to the calculated probability (S57). The terminal 100-A transmits a relay permission signal using the relay slot (S58). Then, on receipt thereof, the terminal 100-B transmits relay data to the terminal 100-A (S59). The terminal 100-A receives the relay data in the relay slot, and transmits the received relay data to the GW 200 (S60).

Meanwhile, the terminal 100-C, when successfully receiving the relay request signal in the common slot (Yes in S65), extracts the number of available relay terminals included in the relay request signal, and calculates probability to make the relay slot active on the basis of the extracted number of available relay terminals (S67). In the example depicted in FIG. 14, a case of not activating the relay slot is illustrated. If the relay slot is made active, the terminal 100-C transmits a relay permission signal (S68), so that the terminal 100-B transmits relay data through the terminal 100-C to the GW 200 (S69-S70).

In the present fourth embodiment, each relay terminal 100-A, 100-C calculates probability to make the relay slot active. There may be a case that neither relay terminal 100-A nor 100-C makes the relay slot active. In such a case, the terminal 100-B does not receive a relay permission signal and therefore does not transmit relay data. In this case, the terminal 100-B transmits a relay request signal using the common slot in the next frame. Then, each relay terminal 100-A, 100-C, on receiving the relay request signal, calculates again probability to make the relay slot active. Thus, the terminal 100-B continues the transmission of the relay request signal using the common slot in each frame, until the terminal 100-B can transmit the relay data.

Meanwhile, there may be another case that both relay terminals 100-A, 100-C make the relay slot active. In this case, for example, because the relay slot of the terminal 100-A arrives earlier than the relay slot of the terminal 100-B, relay is performed using the relay slot of the terminal 100-A. In this case, the relay slot of the terminal 100-C is wasted. However, in comparison with a case when each terminal 100-A, 100-C receiving the relay request signal makes the relay slot active at all times, power consumption in each relay terminal 100-A, 100-C can be reduced because there is a case when the relay slot is made sleep.

In the present fourth embodiment also, the GW 200 does not detect whether each terminal 100-A to 100-D fails to transmit data or does not transmit data, and in such a case also, relay operation can be performed.

Also, the terminal 100-D not performing relay operation is in the sleep mode if the transmission slot (or relay slot) is allocated, and accordingly, power consumption can be reduced in comparison with a case when the relay slot is made active. Further, each terminal 100-A to 100-C, after completing the relay operation, makes the relay slot sleep without activating, and accordingly, power consumption can be reduced.

In the present fourth embodiment, the description has been given on the example in which the number of available relay terminals is calculated based on communication history information. However, it may also be possible to calculate the number of available relay terminals in a manner that the terminal 100-B that fails to transmit data inquires of the other terminals 100-A, 100-C and 100-D whether or not relay is possible.

For example, the terminal 100-B broadcast transmits a signal indicative of whether or not relay is possible, and when acquiring a signal indicating the relay is possible, the terminal 100-B determines the number of terminals that reply relay is possible to be the number of available relay terminals. In this case, in the terminals 100, the communication history storage 110 depicted in FIG. 12 may be unnecessary.

Also, the description has been given on the example in which the number of available relay terminals is calculated based on each past communication history of the terminals 100. However, it is possible to exchange between the terminals 100 the identification information of each self-terminal using a dedicated slot, so that the terminal 100-B, for example, can determine the number of received identification information sets to be the number of available relay terminals.

Fifth Embodiment

Next, a fifth embodiment will be described. In the fourth embodiment, for example, there may a case that the relay slot is made sleep on the basis of the number of available relay terminals, to thereby enable the reduction of the number of relay terminals. However, if radio quality between a terminal that fails to transmit data and a relay terminal varies larger than a variation threshold, there is a case of being unable to guarantee the reception of the relay data in the relay terminal.

To cope with the above problem, according to the present fifth embodiment, a relay terminal 100 is configured to use an index that represents stability related to the radio section, in addition to the number of available relay terminals, to determine whether or not to make the relay slot active.

By this, for example, the relay terminal 100 determines whether or not to make the relay slot active, taking into account the state of the radio section, and accordingly, the relay terminal can receive the relay data with higher probability than the example of the fourth embodiment.

For example, the stability represents an index related to communication stability in the radio section between the terminal that fails to transmit data and the relay terminal. For example, the probability of relay data reception at the relay terminal becomes higher as the stability is higher, and the probability becomes lower as the stability is lower.

The above stability may be calculated based on a variation frequency of reception power strength in the radio section between the terminal that fails to transmit data and the relay terminal, the magnitude of variation in the number of available relay terminals, etc., for example. Or, the stability may be the very magnitude of such a variation frequency and a variation.

Figure 15:
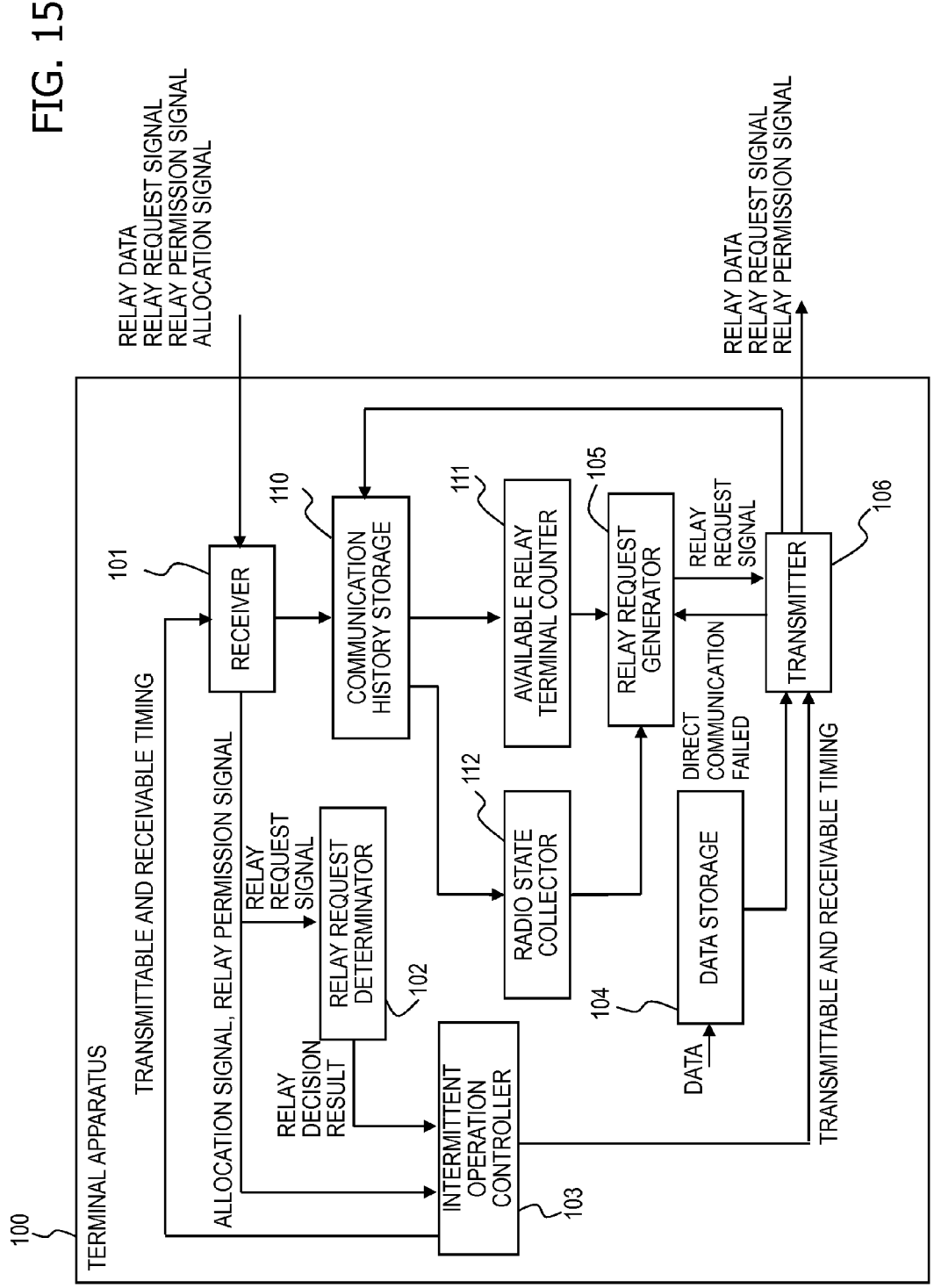
FIG. 15 is a diagram illustrating a configuration example of a terminal.

FIG. 15 is a diagram illustrating a configuration example of the terminal 100 according to the fifth embodiment. The terminal 100 further includes a radio state collector 112.

In the communication history storage 110, there is included reception power strength of a radio signal when the radio signal is transmitted and received between with the relay terminal 100, for example. For example, the receiver 101 may receive the radio signal between with the relay terminal 100 by carrier sense etc. and may actually receive relay data. The receiver 101 measures the reception power strength of the radio signal concerned, so as to store the reception power strength and the measured time on a terminal-by-terminal basis, as communication history information. The communication history information includes the number of times of relay data transmission from each terminal, the reception power strength at each terminal, the measurement time of the reception power strength, etc.

The radio state collector 112 reads out the reception power strength and the measurement time from the communication history storage 110 on a terminal-by-terminal basis, and detects the time variation of the terminal-by-terminal reception power strength to measure the variation frequency of the reception power strength per unit time. The radio state collector 112 may determine the measured variation frequency as stability.

Alternatively, the radio state collector 112 reads out the number of times of relay data transmission from the communication history storage 110, and extracts terminals having the number of times of transmission larger than a threshold, to calculate the number of extracted terminals as the number of available relay terminals, and detects the variation of the number of available relay terminals per unit time. The radio state collector 112 may determine the detected variation value as stability, or may calculate stability from the combination of the detected variation value with the variation frequency of the reception power strength per unit time.

The radio state collector 112 may also determine another index as stability, if the other index related to the stability of the radio section can be calculated, for example.

The relay request generator 105 in the present fifth embodiment generates a relay request signal that includes the number of available relay terminals received from the available relay terminal counter 111 and the stability received from the radio state collector 112.

Figure 16A:
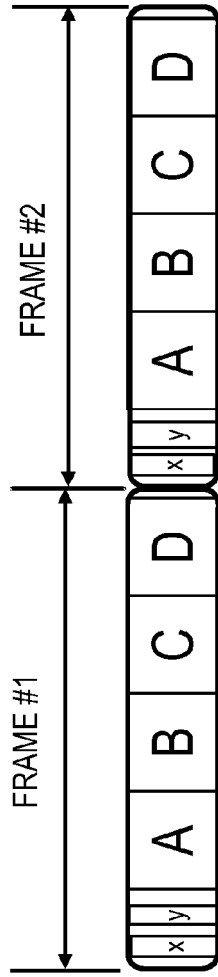
FIG. 16A is a diagram illustrating a configuration example of a frame.
Figure 16B:
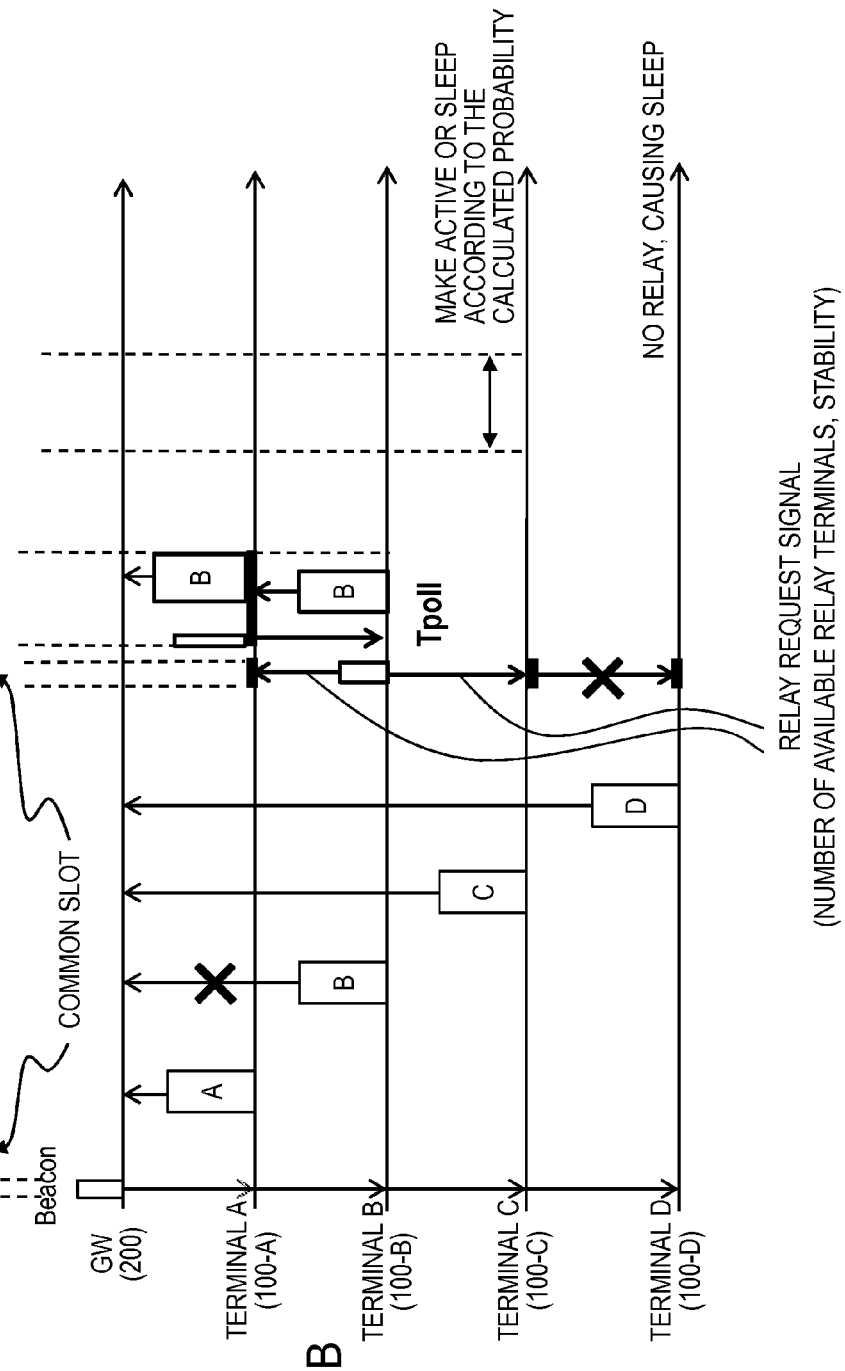
FIG. 16B is a diagram illustrating an operation example when relay is performed.

FIG. 16A is a diagram illustrating a frame configuration example, and FIG. 16B is a diagram illustrating an example of relay operation. As depicted in FIG. 16B, the terminal 100-B broadcast transmits the relay request signal that includes the number of available relay terminals and the stability, so that the terminals 100-A, 100-C receive the relay request signal. Each terminal 100-A, 100-C calculates possibility for making each relay slot active, on the basis of the number of available relay terminals and the stability included in the relay request signal, so as to activate the relay slot according to the calculated probability. In the example in FIG. 16B, the terminal 100-A makes the relay slot active, whereas the terminal 100-C makes the relay slot sleep.

A sequence example according to the present fifth embodiment is illustrated in FIG. 14, similar to the fourth embodiment, for example. In FIG. 14, the terminal 100-B transmits the relay request signal including the number of available relay terminals (S54). The terminal 100-B may transmit the relay request signal including the number of available relay terminals and the stability.

Also, each relay terminal 100-A, 100-C calculates probability whether or not to make each relay slot active, on the basis of the number of available relay terminals and the stability, and make the relay slot active according to the calculated probability (S57, S67).

The above processing is performed in the following manner, for example. Namely, the relay request determinator 102, on receiving the relay request signal from the receiver 101 in the common slot, extracts the number of available relay terminals and the stability, from the relay request signal. Based on the above two indexes, the relay request determinator 102 calculates probability whether to make the relay slot active (or to perform relay) or sleep (or not to perform relay). According to the probability, the relay request determinator 102 outputs to the intermittent operation controller 103 the decision result whether or not to make the relay active. When obtaining the decision result to make the relay slot active, the intermittent operation controller 103 outputs timing signals to the receiver 101 and the transmitter 106, at the start timing and the end timing of the relay slot. This causes the relay slot to be made active. On the other hand, if the relay request determinator 102 determines to make the relay slot sleep according to the probability that leads the decision result not to perform relay, the relay request determinator 102 does not perform processing in particular.

In the present fifth embodiment also, the relay operation can be performed if the GW 200 is unable to detect whether each terminal 100-A to 100-D fails to transmit data or does not transmit the data.

Also, because the terminal 100-D not performing relay operation is in the sleep mode if the relay slot is allocated thereto, power consumption can be reduced. Further, after the completion of the relay operation, because the terminals 100-A to 100-C do not become the active mode even in the relay slot period, except for the cases of performing data transmission and other relay, power consumption can be reduced.

Other Embodiments

Next, other embodiments will be described.

In the second to fifth embodiments, descriptions have been given on a case that each terminal 100-A to 100-D periodically transmits data, for example. The present radio communication system 10 is applicable to an event-driven radio communication system, for example. For example, the event-driven radio communication system 10 is used for a security system, in which on the occurrence of an event such that an intruder is detected, image data etc. in which the intruder is captured by a sensor etc. are transmitted from the sensor to each terminal 100-A to 100-D. The terminal 100-A to 100-D transmits data such as the image data to the GW 200.

Figures 17A, 17B:
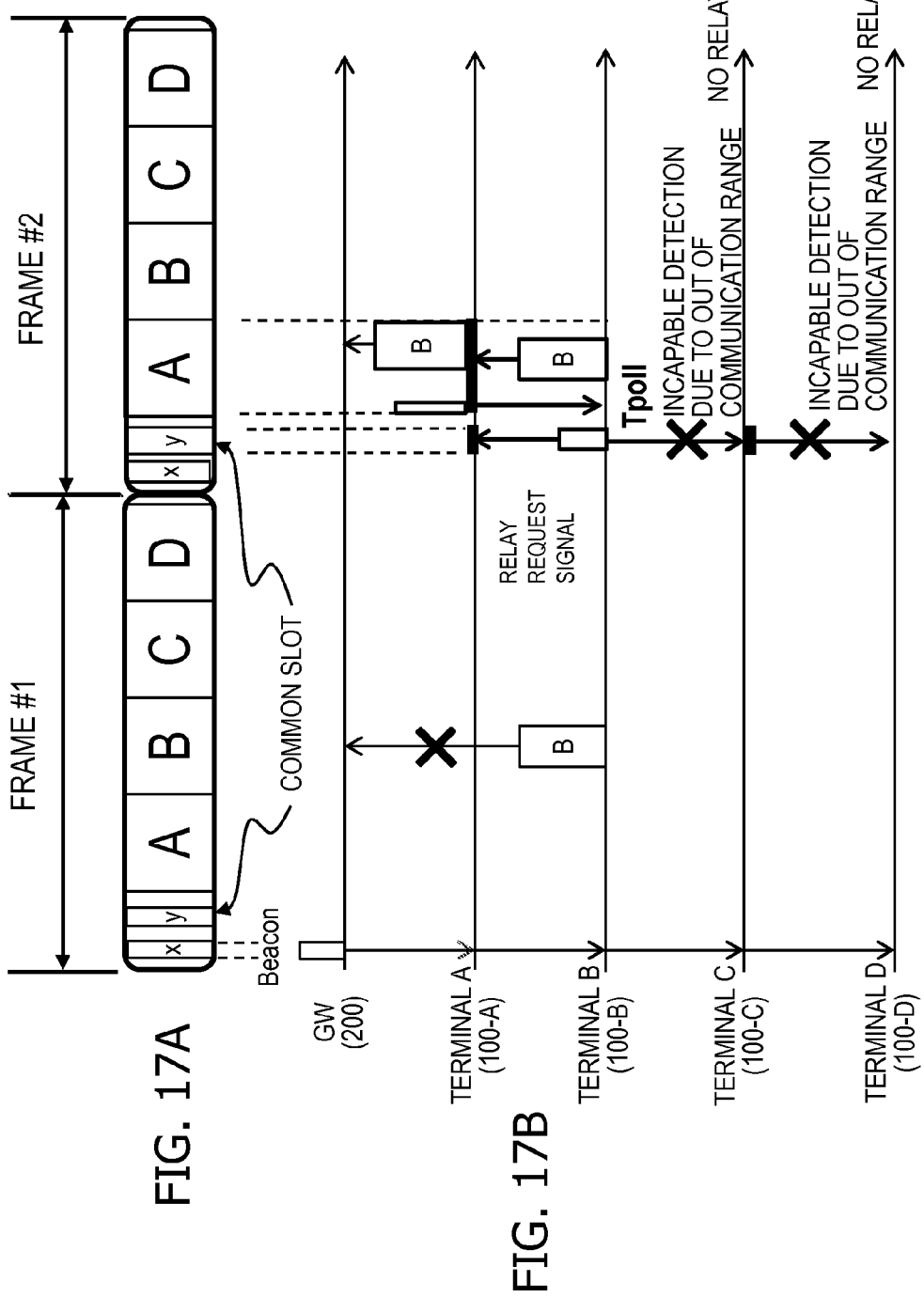
FIG. 17A is a diagram illustrating a configuration example of a frame.
FIG. 17B is a diagram illustrating an operation example when relay is performed.

FIG. 17A illustrates a frame configuration example in the event-driven radio communication system 10, and FIG. 17B illustrates an example of relay operation in such a radio communication system 10.

In the event-driven radio communication system 10, a data transmission frequency is relatively low in comparison with the case of periodic data transmission. When no transmission data is received from each terminal 100-A to 100-D, it is difficult for the GW 200 to detect whether the terminal 100-A to 100-D does not transmit data or fails to transmit the transmission data.

Also in such a case, the terminal 100-B that fails to transmit data transmits a relay request signal using the common slot, and the terminal 100-A, on receipt thereof, utilizes the allocated transmission slot for data relay as a relay slot.

Relay operation in the event-driven radio communication system 10 can be performed in a similar manner to the case of the second embodiment as depicted in FIG. 17B, for example.

Accordingly, in the event-driven radio communication system 10 also, the relay operation can be performed if the GW 200 is unable to detect whether each terminal 100-A to 100-D fails to transmit data or does not transmit the data.

Also, each terminal 100-C, 100-D that does not perform relay operation makes the transmission slot (or relay slot) sleep. This enables the reduction of power consumption in comparison with a case when making the transmission slot active. Further, after the completion of the relay operation, the transmission slot of each terminal 100-A, 100-B is in the sleep mode except for the cases of performing data transmission and other relay. This enables the reduction of power consumption in comparison with a case when the transmission slot is kept active.

In the second to fourth embodiments, the configuration examples of the terminal 100 and the GW 200 have been described. It is also possible to implement the second to fourth embodiments using hardware configuration examples depicted in FIGS. 18A, 18B, for example.

Figure 18A:
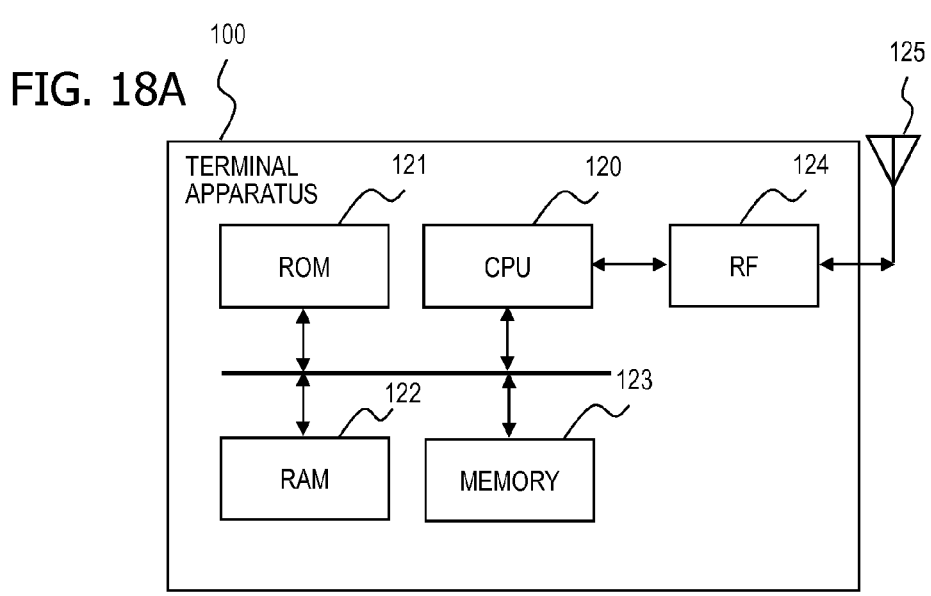
FIG. 18A is a diagram illustrating a configuration example of a terminal.

FIG. 18A illustrates a configuration example of the terminal 100. The terminal 100 includes a CPU (Central Processing Unit) 120, a ROM (Read Only Memory) 121, a RAM (Random Access Memory) 122, a memory 123, an RF (Radio Frequency) 124 and an antenna 125.

The CPU 120 reads out a program stored in the ROM 121 to load on the RAM 122, and reads out the loaded program to execute. By such execution of the loaded program, the CPU 120 can actualize the functions of the receiver 101, the relay request determinator 102, the intermittent operation controller 103, the relay request generator 105, the transmitter 106, the available relay terminal counter 111 and the radio state collector 112 as described in the second embodiment etc., for example. Accordingly, the CPU 120 corresponds to the receiver 101, the relay request determinator 102, the intermittent operation controller 103, the relay request generator 105, the transmitter 106, the available relay terminal counter 111 and the radio state collector 112, for example.

Also, the memory 123 corresponds to the data storage 104 and the communication history storage 110 described in the second embodiment etc., for example.

Further, the RF 124 performs frequency conversion processing on data etc. output from the CPU 120, to convert into a radio signal to output to the antenna 125. The RF 124 also converts a radio signal received by the antenna 125 into a baseband signal, to output to the CPU 120. Accordingly, the RF 124 and the antenna 125 correspond to the receiver 101 and the transmitter 106 in the second embodiment, for example.

Here, the CPU 120 may be another processor such as an MPU (Micro Processing Unit) and an FPGA (Field Programmable Gate Array), for example.

Figure 18B:
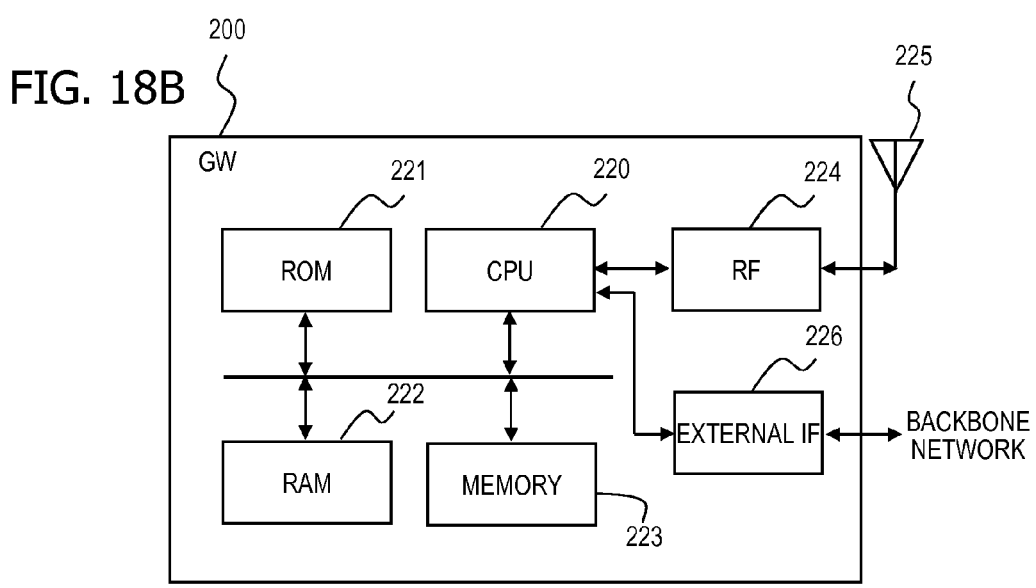
FIG. 18B is a diagram illustrating a configuration example of a GW.

FIG. 18B illustrates a configuration example of the GW 200. The GW 200 includes a CPU 220, a ROM 221, a RAM 222, a memory 223, an RF 224, an antenna 225 and an external interface (IF) 226.

The CPU 220 also reads out a program stored in the ROM 221 to load on the RAM 222 to execute the loaded program. By such execution of the program, the CPU 220 can actualize the functions of the receiver 201, the communication time allocator 202, the data processor 203 and the transmitter 204 described in the second embodiment etc., for example. Accordingly, the CPU 220 corresponds to the receiver 201, the communication time allocator 202, the data processor 203 and the transmitter 204, for example.

Also, the RF 224 performs frequency conversion such as upconverting and downconverting, to output a radio signal to the antenna 225 and output a baseband signal to the CPU 220. Accordingly, the RF 224 and the antenna 225 correspond to the receiver 201 and the transmitter 204 in the second embodiment, for example.

Further, the external IF 226 converts data being output from the CPU 220 into a format transmittable to a backbone network, and also, extracts a data part from the data of a predetermined format received from the backbone network. Accordingly, the external IF 226 corresponds to the data processor 203 in the second embodiment, for example.

The CPU 220 may also be another processor such as MPU and FPGA, for example.

In the aforementioned second to fifth embodiments, the descriptions are given on the example in which the relay terminal 100-A that receives the relay request signal transmits the relay permission signal using the relay slot, and the terminal 100-B receives the relay permission signal. However, the relay terminal 100-A can perform relay operation without transmitting the relay permission signal. In such a case, the following processing is performed, for example.

Namely, the terminal 100-B obtains information indicating that radio quality between the terminal 100-A and the GW 200 is satisfactory, from a beacon signal etc. If the terminal 100-B fails to transmit data to the GW 200, the terminal 100-B transmits relay data to the terminal 100-A on the basis of the above information. In this case, because the terminal 100-B obtains information related to the transmission slot of each terminal 100-A, 100-C, 100-D from the beacon signal, the terminal 100-B can obtain information of the transmission slot of the terminal 100-A on the basis of the information of the terminal 100-A whose radio quality is satisfactory.

In the above example, for example, without transmission of the relay request signal, data transmission for that amount can be performed. Therefore, effective utilization of radio resources in the terminals 100-A to 100-D can be achieved.

Also, in the above-mentioned second to fifth embodiments, the description is given on the example of one-hop communication, in which the relay data is transmitted through a single relay terminal 100-A. It is also possible to perform data relay in the case of two hops or more.

For example, when the terminal 100-D fails to transmit data and transmits a relay request signal, and the terminal 100-C, on receipt thereof, functions as a relay terminal to transmit the relay data to the GW 200, and if the terminal 100-C fails to transmit the relay data, the terminal 100-C transmits a relay request signal using the common slot. On receiving the relay request signal, the terminal 100-B functions as a relay terminal to receive the relay data from the terminal 100-C, and then transmits the received relay data to the GW 200. In such a manner, two-hop communication can be achieved. If another terminal performs such operation, communication of three hops or more can also be achieved.

As such, it is possible to provide a radio communication system, a radio communication apparatus and a relay method, capable of relaying data if a data collection apparatus is unable to detect whether the radio communication apparatus fails to transmit data or is not transmitting data.

Also, it is possible to provide a radio communication system, a radio communication apparatus and a relay method, capable of reducing power consumption in the radio communication apparatus.

Further, in the above-mentioned third embodiment, the description has been given on the example of performing probability calculation on the basis of the history information and data transmission according to the calculated probability (for example, S31 and S34 in FIG. 10). A description on a typical example will be given in the following.

Figure 19:
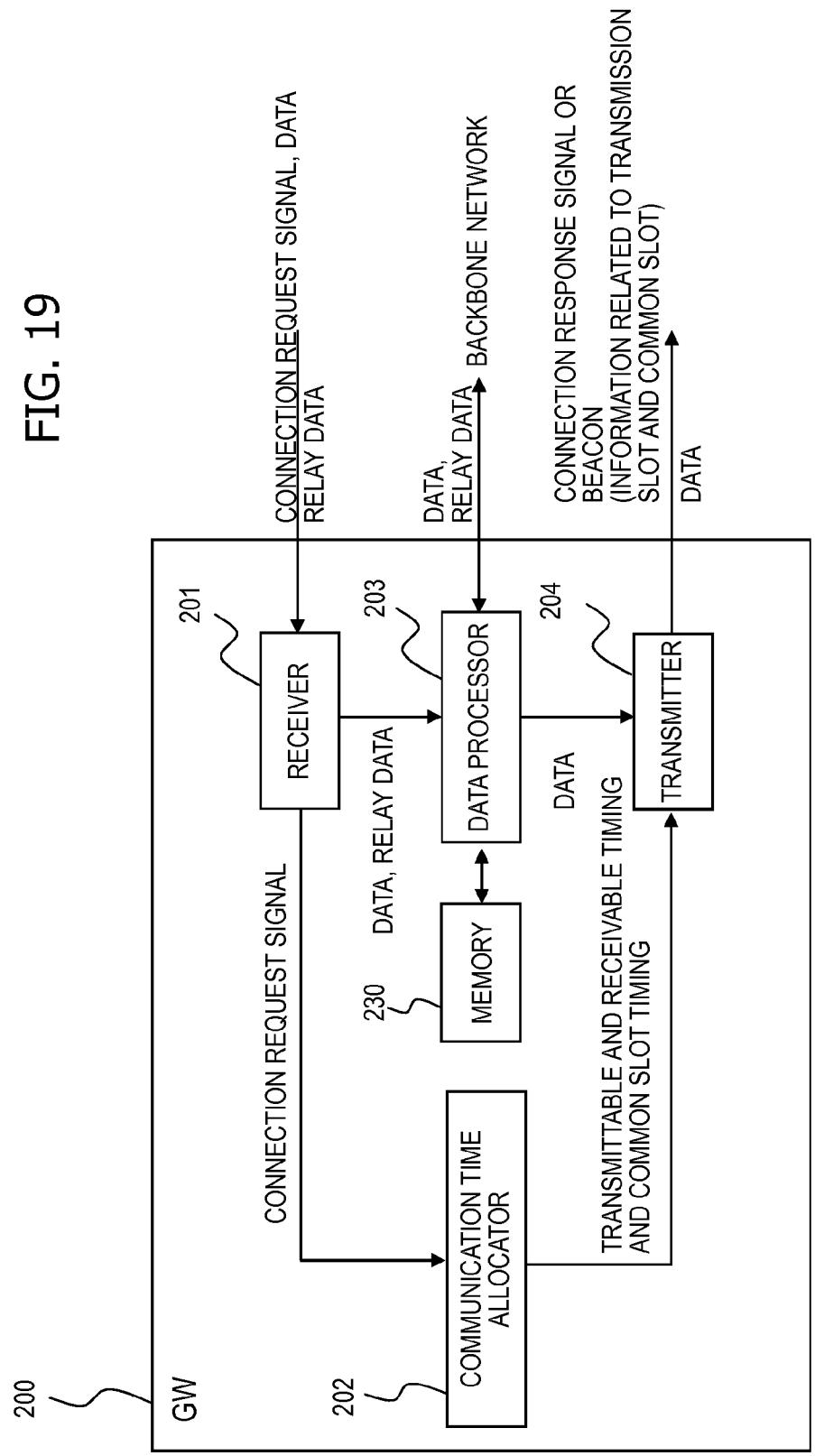
FIG. 19 is a diagram illustrating a configuration example of a GW.

FIG. 19 is a diagram illustrating a configuration example of the GW 200. The GW 200 further includes a memory 230. For example, the data processor 203 stores history information in the memory 230, to process probability calculation etc. on the basis of the history information. For example, such processing as the following is performed.

Figures 20A, 20B:
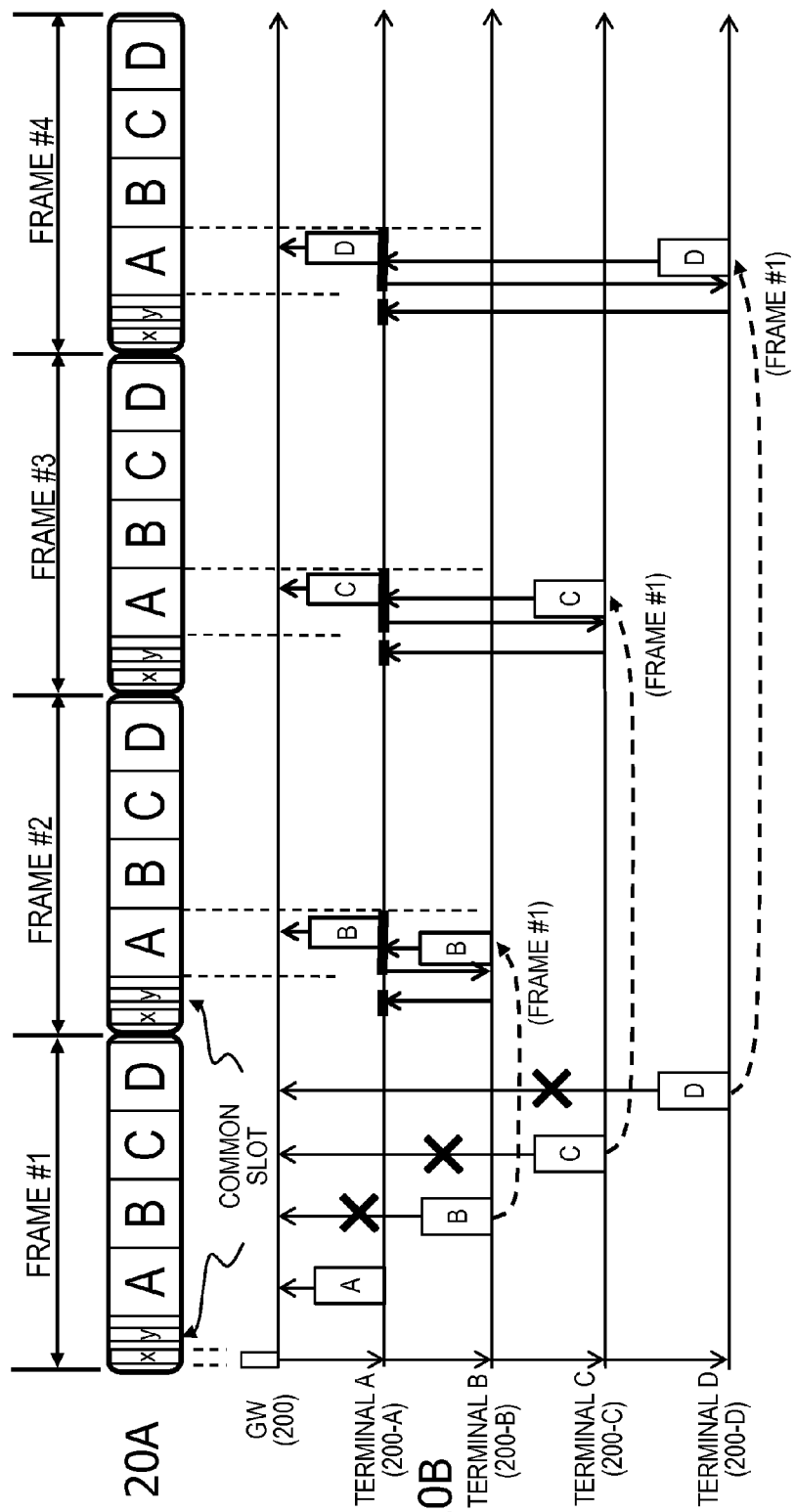
FIG. 20A is a diagram illustrating an example of a frame.
FIG. 20B is a diagram illustrating an example of relay operation.

FIG. 20A is a diagram illustrating an example of a frame configuration, and FIG. 20B is a diagram illustrating an example of relay operation. The example depicted in FIG. 20B illustrates a case when the terminal 100-A successfully transmits data using the transmission slot of the self-terminal in a frame #1, whereas the terminals 100-B, 100-C fail to transmit data using the transmission slots of the self-terminals. The terminals 100-B, 100-C failing to transmit data may be referred to as "terminals failing in simultaneous transmission", for example.

The terminal 100-B acquires, as time stamp information, the time of data transmission (or the time when, in spite of data transmission, a failed data transmission is confirmed due to failed reception of an ACK signal from the GW 200 within a certain time). The time stamp information may be the time itself or may be a frame number. In the example of FIG. 20B, a frame number such as "frame #1" is illustrated. For example, the transmitter 106 of the terminal 100 counts the time of data transmission using an internal timer, or the receiver 101 counts the time when failed ACK signal reception is confirmed, using an internal timer, so that the time stamp information is acquired.

The terminal 100-B receives a relay permission signal in a frame #2 from the terminal 100-A, and transmits to the terminal 100-A the data of which transmission fails, as relay data. At this time, the terminal 100-B transmits the relay data that includes the time stamp information (for example, "frame #1") and the identification information of the self-terminal. For example, the transmitter 106 generates and transmits relay data that includes the identification information of the self-terminal, read out from the internal memory, and the time stamp information acquired either from the receiver 101 or by the self.

Also, the terminal 100-C receives in a frame #3 the relay permission signal from the terminal 100-A, and transmits the relay data to the terminal 100-A. At this time, the terminal 100-C also transmits the relay data including the time stamp information (for example, frame #1) and the identification information of the self-terminal.

Further, the terminal 100-D receives in a frame #4 the relay permission signal from the terminal 100-A, to transmit the relay data to the terminal 100-A. At this time, the terminal 100-D also transmits the relay data including the time stamp information (for example, frame #1) and the identification information of the self-terminal.

Meanwhile, the GW 200 extracts the identification information of the terminal 100-B from data received from the terminal 100-A in a frame #2. At this time, when extracting the identification information of the terminal 100-B in spite of reception through the transmission slot of the terminal 100-A, the GW 200 determines that the received data is the relay data of the terminal 100-B. The GW 200 also extracts time stamp information (for example, frame #1) from the data received from the terminal 100-A.

Similarly, the GW 200, when extracting the identification information of the terminal 100-C from data received from the terminal 100-A in a frame #3, determines that the received data is relay data, and extracts time stamp information. The GW 200 also determines that data received from the terminal 100-A is relay data, and extracts time stamp information.

As such, the GW 200 extracts the time stamp information from the relay data received in each frame, to store into the memory 230 as history information, for example.

Figures 21A, 21B, 21C:
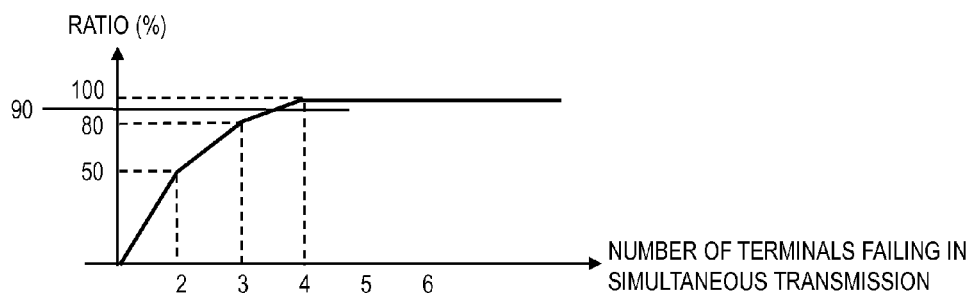
FIG. 21A is a diagram illustrating an example of history information.
FIG. 21B and FIG. 21C are diagrams illustrating an example of probability calculation.

FIG. 21A illustrates an example of history information 231. The history information 231 includes the number of terminals that fails in simultaneous transmission (which may hereafter be referred to as "the number of terminals") and the time stamp information. The GW 200 calculates the number of terminals in the following manner, for example.

Namely, the GW 200 counts the number of relay data that includes the same time stamp in the relay data received in a certain period (for example, in a four-frame period). For example, in the example of FIG. 20, the GW 200 counts "3" as the number of relay data including the time stamp information of frame #1. The above "3" comes to the number of terminals that fail in simultaneous transmission in the frame #1.

For example, each terminal 100-B to 100-D failing in simultaneous transmission performs transmission using a relay slot that appears frame-by-frame (for example, the transmission slot of the terminal 100-A). Therefore, the GW 200 can calculate the number of terminals failing in simultaneous transmission by counting the number of times of relay data reception, including the same time stamp information, within a certain period.

The GW 200 calculates the number of terminals in the above-mentioned manner, and stores the time stamp information into a corresponding field of the history information 231. In the example of FIG. 21A, "frame #1" is stored into the field of time stamp information corresponding to the number of terminals "3".

In such a manner, the GW 200 stores the history information 231 for a certain period. In the example depicted in FIG. 21A, the number of terminals "2" is "N1 times" and the number of terminals "3" is "N2 times". The above examples represent that there are "N1 times" when the number of terminals failing in simultaneous transmission in a certain time is "2", and "N2 times" when the number of terminals failing in simultaneous transmission in a certain time is "3".

Then, the GW 200 calculates probability on the basis of the history information 231 thus stored. FIG. 21B illustrates an example of the number of times corresponding to each number of terminals. Since the number of times is "100" when the number of terminals is "2", probability when the number of terminals failing in simultaneous transmission comes to "2" is 100/200=0.5 (50%). Similarly, probability when the number of terminals failing in simultaneous transmission comes to "3" is 60/200=0.3 (30%), and probability when the number of terminals failing in simultaneous transmission comes to "4" is 40/200=0.2 (20%).

The GW 200 selects the number of terminals achieving the highest probability among the calculated probability sets, and transmits to the terminals 100-A to 100-D the probability corresponding to the selected number of terminals (or the reciprocal of the number of terminals). In the example of FIG. 21B, the number of terminals "2" comes to achieve the highest probability of "50%", and therefore, the GW 200 transmits to the terminals 100-A to 100-D the probability of "1/2" corresponding to the number of terminals "2". The value comes to "1/3" if probability for the number of terminals "3" is the highest, and "1/4" if probability for the number of terminals "4" is the highest, and so on.

The GW 200 transmits the probability calculated in such a manner by including into a beacon signal, for example (S20 in FIG. 10). Then, each terminal 100-B, 100-C, on receiving a relay permission signal (S30), transmits data according to the received probability (for example, "1/2") (S31, S34).

In the above-mentioned example, the description has been given on the example such that the GW 200 selects the number of terminals achieving the highest probability to calculate probability based thereon. As depicted in FIG. 21C, it may also be possible for the GW 200 to calculate the probability on the basis of a threshold related to a ratio. For example, when a threshold related to the ratio is "90%", the GW 200 accumulates probability from the smallest number of terminals to the largest, so as to select the number of terminals "4" that produces the cumulative value of "90%" or greater. Then, the GW 200 transmits to each terminal 100-A to 100-D the probability of "1/4" corresponding to the number of terminals "4".

Further, the above-mentioned example describes that the GW 200 calculates the probability. For example, the relay terminal 100-A may calculate the above-mentioned probability. For example, in the example depicted in FIG. 10, the terminal 100-B retains the data transmission time (or the time when the failed data transmission is confirmed), as time stamp information (S22). Also, the terminal 100-C retains such time stamp information (S23). Each terminal 100-B, 100-C transmits to the terminal 100-A a relay request signal including the time stamp information and the identification information (S24, S25). For example, as depicted in FIG. 12, the relay request generator 105 in each terminal 100-B, 100-C generates the relay request signal including the time stamp information, and transmits the relay request signal through the transmitter 106.

By reference back to FIG. 10, the relay terminal 100-A generates the history information 231 on the basis of the time stamp information etc., and calculates probability on the basis of the history information 231. The relay terminal 100-A transmits the calculated probability by including in the relay permission signal (S30). According to the probability, each terminal 100-B, 100-C transmits data (S31, S34). For example, the history information 231 is stored in the communication history storage 110, and the transmitter 106 appropriately reads out the history information 231 to calculate probability, so as to transmit the relay permission signal including the calculated probability.

Further, in the above-mentioned third embodiment, the description has been given on the example of performing relay operation when the reception signal strength is a signal level threshold or larger (for example, S27 in FIG. 10, S37 in FIG. 11, etc.). The signal level threshold may be determined based on a value specified in "18.3.10.6" of IEEE 802.11-2012. A value specified therein is, for example, "−82 dBm" etc. The signal level threshold may be different according to each radio signal bandwidth transmitted/received among the terminals 100-A to 100-D and between each terminal 100-A to 100-D and the GW 200. Or, a value with a margin added to the "−82 dBm" may be applicable as the signal level threshold.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

No. 1 A method for digital communication in a system comprising a gateway apparatus, a first radio communication apparatus, and a second radio communication apparatus, the first radio communication apparatus and the second radio communication apparatus each being configured to wirelessly transmit data to the gateway apparatus, the method comprising:

at the first radio communication apparatus, sending first data to the gateway apparatus during a first time slot of a radio frame, the radio frame comprising a contact slot, the first time slot allocated to the first radio communication apparatus for data transmission, and a second time slot allocated to the second radio communication apparatus for data transmission;

determining whether the first data has been received by the gateway apparatus;

upon determining that the first data has not been received by the gateway apparatus, sending a relay request signal to the second radio communication apparatus during the contact slot of the radio frame;

in response to the relay request signal, receiving a response signal from the second radio communication apparatus; and when the response signal comprises a relay permission signal from the second radio communication apparatus, sending the first data, as relay data, to the second radio communication apparatus such that the first data is to be transmitted to the gateway apparatus by the second radio communication apparatus.

No. 2 The method of No. 1, wherein sending the first data, as relay data, to the second radio communication apparatus comprises sending the first data to the second radio communication apparatus during the second time slot allocated to the second radio communication apparatus.

No. 3 The method of No. 1, wherein the relay request signal comprises identification information of the first radio communication apparatus.

No. 4 The method of No. 1, wherein the relay permission signal comprises identification information of the second radio communication apparatus.

No. 5 The method of No. 1, wherein the radio frame is configured in accordance with a time division multiple access (TDMA) method and the contact slot of the radio frame is a time period allocated to the first and second radio communication apparatuses for communication.

No. 6. The method of No. 1, wherein sending a relay request signal to the second radio communication apparatus during the contact slot comprises broadcasting the relay request signal to other radio communication apparatuses including the second radio communication apparatus during the contact slot of the radio frame.

No. 7 The method of No. 1, wherein determining whether the first data has been received by the gateway apparatus comprises determining whether the first data has been received by the gateway apparatus based on a status of receipt of an acknowledgement message, regarding the first data, received from the gateway apparatus.

No. 8 The method of No. 1, further comprising, after sending the first data to the second radio communication apparatus for relaying the first data to the gateway apparatus, placing the first radio communication apparatus in a power saving mode.

No. 9 The method of No. 1, wherein the gateway apparatus comprises a data collection apparatus, and the first and second radio communication apparatuses each are equipped with one or more sensors.

No. 10 The method of No. 5, wherein the gateway apparatus is configured to allocate the first time slot to the first radio communication apparatus and the second time slot to the second radio communication apparatus in accordance with the TDMA method.

No. 11 The method of No. 1, wherein the radio frame comprises a direct communication section including the first time slot and the second time slot, and a relay communication section including the contract slot and one or more relay slots.

No. 12 The method of No. 3, wherein the relay request signal further comprises a number of available radio communication apparatuses that can be used by the first radio communication apparatus as relay terminals.

No. 13. The method of No. 1, further comprising, when the response signal comprises the relay permission signal from the second radio communication apparatus, determining whether to send the first data, as the relay data, to the second radio communication apparatus in a current radio frame, based on a probability calculation.

No. 14 The method of No. 13, wherein the probability calculation is based on at least one of: a signal quality of the gateway apparatus and relay history information.

No. 15 The method of No. 13, wherein the probability calculation is based on a number of available radio communication apparatuses that can be used as relay terminals by the first radio communication apparatus.

No. 16 A method for digital communication in a system comprising a gateway apparatus, a first radio communication apparatus, and a second radio communication apparatus, the first radio communication apparatus and the second radio communication apparatus each being configured to wirelessly transmit data to the gateway apparatus, the method comprising:

at the second radio communication apparatus, receiving a relay request signal from the first radio communication apparatus during a contact slot of a radio frame, the radio frame comprising the contact slot, a first time slot allocated to the first radio communication apparatus for data transmission, and a second time slot allocated to the second radio communication apparatus for data transmission;

in response to the relay request signal, sending a response signal to the first radio communication apparatus;

receiving the first data, as relay data, from the first radio communication apparatus during the second time slot of the radio frame; and sending the first data to the gateway apparatus during the second time slot of the radio frame.

No. 17 The method of No. 16, wherein the relay request signal comprises identification information of the first radio communication apparatus.

No. 18 The method of No. 17, wherein the relay request signal further comprises a number of available relay terminals, the available relay terminals being radio communication apparatuses that can be used as relay terminals by the first radio communication apparatus.

No. 19 The method of No. 18, further comprising determining whether to operate a relay terminal for the first radio communication apparatus based on at least one of a probability calculation or stability information.

No. 20 The method of No. 19, wherein the probability calculation is based on the number of available relay terminals included in the relay request signal from the first radio communication apparatus.

No. 21 The method of No. 19, wherein the stability information is determined based on a frequency variation in reception power strength between the first radio communication apparatus and the second radio communication apparatus, or a magnitude of a variation in a number of available relay terminals.

No. 22 The method of No. 16, wherein the response signal comprises a relay permission signal including identification information of the second radio communication apparatus.

No. 23 The method of No. 16, wherein the radio frame is configured in accordance with a time division multiple access (TDMA) method and the contact slot is a time period in the radio frame allocated to the first and second radio communication apparatuses for communication.

No. 24. The method of No. 16, wherein receiving a relay request signal from the first radio communication apparatus during the contact slot comprises receiving the relay request signal from the first radio communication apparatus by a broadcast of the relay request signal during the contact slot.

No. 25 The method of No. 16, further comprising, after receiving the relay request signal from the first radio communication apparatus, determining whether the second radio communication apparatus is to operate as a relay terminal for the first radio communication apparatus, based on one or more factors.

No. 26 The method of No. 25, wherein the one or more factors include a radio signal quality between the second radio communication apparatus and the gateway apparatus.

No. 27 The method of No. 16, further comprising, after sending the first data to the gateway apparatus, placing the second radio communication apparatus in a power saving mode.

No. 28 The method of No. 16, wherein the gateway apparatus comprises a data collection apparatus, and the first and second radio communication apparatuses each are equipped with one or more sensors.

No. 29 The method of No. 16, wherein the gateway apparatus is configured to allocate the first time slot to the first radio communication apparatus and the second time slot to the second radio communication apparatus.

No. 30 The method of No. 16, further comprising determining whether the relay request signal is received based on a signal strength of a reception signal received in the contact slot of the radio frame.

No. 31 The method of No. 30, wherein the relay request signal is determined to be received when the signal strength of the reception signal received in the contact slot of the radio frame is higher than a threshold value.

No. 32 A radio communication system comprising:

a gateway apparatus;

a plurality of radio communication apparatuses coupled to the gateway apparatus, the plurality of radio communication apparatuses including a first radio communication apparatus, and a second radio communication apparatus, wherein:

the first radio communication apparatus is configured to:

send first data to the gateway apparatus during a first time slot of a radio frame, the radio frame comprising a contact slot, the first time slot allocated to the first radio communication apparatus for data transmission, and a second time slot allocated to the second radio communication apparatus for data transmission;

determine whether the first data has been received by the gateway apparatus;

upon determining that the first data has not been received by the gateway apparatus, send a relay request signal to the second radio communication apparatus during the contact slot of the radio frame;

in response to the relay request signal, receive a response signal from the second radio communication apparatus; and when the response signal comprises a relay permission signal from the second radio communication apparatus, send the first data, as relay data, to the second radio communication apparatus such that the first data is to be transmitted to the gateway apparatus by the second radio communication apparatus.

No. 33 The radio communication system of No. 32, wherein the second radio communication apparatus is configured to:

receive the relay request signal from the first radio communication apparatus during the contact slot of the radio frame;

responsive to the relay request signal, send the response signal to the first radio communication apparatus;

receive the first data, as the relay data, from the first radio communication apparatus during the second time slot of the radio frame; and send the first data to the gateway apparatus during the second time slot of the radio frame.

No. 34 The radio communication system of No. 32, wherein the first radio communication apparatus is further configured to send the first data to the second radio communication apparatus during the second time slot allocated to the second radio communication apparatus.

No. 35. The radio communication system of No. 32, wherein the relay request signal comprises identification information of the first radio communication apparatus.

No. 36 The radio communication system of No. 32, wherein the relay permission signal comprises identification information of the second radio communication apparatus.

No. 37 The radio communication system of No. 32, wherein the radio frame is configured in accordance with a time division multiple access (TDMA) method and the contact slot of the radio frame is a time period allocated to the first and second radio communication apparatuses for communication.

No. 38 The radio communication system of No. 32, wherein the first radio communication apparatus is further configured to determine whether the first data has been received by the gateway apparatus based on a status of receipt of an acknowledgement message, regarding the first data, received from the gateway apparatus.

No. 39 The radio communication system of No. 32, wherein the first radio communication apparatus is further configured to, after sending the first data to the second radio communication apparatus for relaying the first data to the gateway apparatus, place the first radio communication apparatus in a power saving mode.

No. 40 The radio communication system of No. 32, wherein the gateway apparatus comprises a data collection apparatus, and the first and second radio communication apparatuses each are equipped with one or more sensors.

No. 41 The radio communication system of No. 32, wherein the gateway apparatus is configured to allocate the first time slot to the first radio communication apparatus and the second time slot to the second radio communication apparatus in accordance with the TDMA method.

No. 42 The radio communication system of No. 32, wherein the radio frame comprises a direct communication section including the first time slot and the second time slot, and a relay communication section including the contract slot and one or more relay slots.

No. 43 The radio communication system of No. 32, wherein the relay request signal further comprises a number of available radio communication apparatuses that can be used by the first radio communication apparatus as relay terminals.

No. 44 The radio communication system of No. 32, wherein the first radio communication apparatus is further configured to, when the response signal comprises the relay permission signal from the second radio communication apparatus, determine whether to send the first data, as the relay data, to the second radio communication apparatus in a current radio frame, based on a probability calculation.

No. 45 The radio communication system of No. 44, wherein the probability calculation is based on at least one of: a signal quality of the gateway apparatus and relay history information.

No. 46 The radio communication system of No. 44, wherein the probability calculation is based on a number of available radio communication apparatuses that can be used as relay terminals by the first radio communication apparatus.

What is claimed is:

1. A method for digital communication in a system comprising a gateway apparatus, a first radio communication apparatus, and a second radio communication apparatus, the first radio communication apparatus and the second radio communication apparatus each being configured to wirelessly transmit data to the gateway apparatus, the method comprising:

at the first radio communication apparatus, sending first data to the gateway apparatus during a first time slot of a radio frame, the radio frame comprising a common slot different from the first slot and a second time slot, the first time slot allocated to the first radio communication apparatus for data transmission, and the second time slot allocated to the second radio communication apparatus for data transmission;

determining whether the first data has been received by the gateway apparatus;

upon determining that the first data has not been received by the gateway apparatus, sending a relay request signal to the second radio communication apparatus during the common slot of the radio frame;

in response to the relay request signal, receiving a response signal from the second radio communication apparatus; and when the response signal comprises a relay permission signal from the second radio communication apparatus, sending the first data, as relay data, to the second radio communication apparatus, and the first data is to be transmitted to the gateway apparatus by the second radio communication apparatus.

2. The method of claim 1, wherein sending the first data, as relay data, to the second radio communication apparatus comprises sending the first data to the second radio communication apparatus during the second time slot allocated to the second radio communication apparatus.

3. The method of claim 1, wherein sending a relay request signal to the second radio communication apparatus during the common slot comprises broadcasting the relay request signal to other radio communication apparatuses including the second radio communication apparatus during the common slot of the radio frame.

4. The method of claim 1, wherein determining whether the first data has been received by the gateway apparatus comprises determining whether the first data has been received by the gateway apparatus based on a status of receipt of an acknowledgement message, regarding the first data, received from the gateway apparatus.

5. The method of claim 1, further comprising, after sending the first data to the second radio communication apparatus for relaying the first data to the gateway apparatus, placing the first radio communication apparatus in a power saving mode.

6. The method of claim 1, wherein the radio frame comprises a direct communication section including the first time slot and the second time slot, and a relay communication section including the common slot and one or more relay slots.

7. The method of claim 1, wherein the relay request signal further comprises a number of available radio communication apparatuses that can be used by the first radio communication apparatus as relay terminals.

8. The method of claim 1, further comprising, when the response signal comprises the relay permission signal from the second radio communication apparatus, determining whether to send the first data, as the relay data, to the second radio communication apparatus in a current radio frame, based on a probability calculation.

9. The method of claim 8, wherein the probability calculation is based on at least one of: a signal quality of the gateway apparatus and relay history information.

10. The method of claim 8, wherein the probability calculation is based on a number of available radio communication apparatuses that can be used as relay terminals by the first radio communication apparatus.

11. A method for digital communication in a system comprising a gateway apparatus, a first radio communication apparatus, and a second radio communication apparatus, the first radio communication apparatus and the second radio communication apparatus each being configured to wirelessly transmit data to the gateway apparatus, the method comprising:
at the second radio communication apparatus,
receiving a relay request signal from the first radio communication apparatus during a common slot different from a first and second time slots, of a radio frame, the radio frame comprising the common slot, the first time slot allocated to the first radio communication apparatus for data transmission, and the second time slot allocated to the second radio communication apparatus for data transmission;
in response to the relay request signal, sending a response signal to the first radio communication apparatus;
receiving the first data, as relay data, from the first radio communication apparatus during the second time slot of the radio frame; and
sending the first data to the gateway apparatus during the second time slot of the radio frame.

12. The method of claim 11, wherein the relay request signal further comprises a number of available relay terminals, the available relay terminals being radio communication apparatuses that can be used as relay terminals by the first radio communication apparatus.

13. The method of claim 12, further comprising determining whether to operate a relay terminal for the first radio communication apparatus based on at least one of a probability calculation or stability information.

14. The method of claim 13, wherein the probability calculation is based on the number of available relay terminals included in the relay request signal from the first radio communication apparatus.

15. The method of claim 13, wherein the stability information is determined based on a frequency variation in reception power strength between the first radio communication apparatus and the second radio communication apparatus, or a magnitude of a variation in a number of available relay terminals.

16. The method of claim 11, wherein the radio frame is configured in accordance with a time division multiple access (TDMA) method and the common slot is a time period in the radio frame allocated to the first and second radio communication apparatuses for communication.

17. The method of claim 11, wherein receiving a relay request signal from the first radio communication apparatus during the common slot comprises receiving the relay request signal from the first radio communication apparatus by a broadcast of the relay request signal during the common slot.

18. The method of claim 11, further comprising, after receiving the relay request signal from the first radio communication apparatus, determining whether the second radio communication apparatus is to operate as a relay terminal for the first radio communication apparatus, based on one or more factors.

19. The method of claim 18, wherein the one or more factors include a radio signal quality between the second radio communication apparatus and the gateway apparatus.

20. The method of claim 11, further comprising, after sending the first data to the gateway apparatus, placing the second radio communication apparatus in a power saving mode.

21. The method of claim 11, further comprising determining whether the relay request signal is received based on a signal strength of a reception signal received in the common slot of the radio frame.

22. A radio communication system comprising:
a gateway apparatus;
a plurality of radio communication apparatuses coupled to the gateway apparatus, the plurality of radio communication apparatuses including a first radio communication apparatus, and a second radio communication apparatus, wherein:
the first radio communication apparatus is configured to:
send first data to the gateway apparatus during a first time slot of a radio frame, the radio frame comprising a common slot different from the first time slot and a second time slot, the first time slot allocated to the first radio communication apparatus for data transmission, and the second time slot allocated to the second radio communication apparatus for data transmission;
determine whether the first data has been received by the gateway apparatus;
upon determining that the first data has not been received by the gateway apparatus, send a relay request signal to the second radio communication apparatus during the common slot of the radio frame;
in response to the relay request signal, receive a response signal from the second radio communication apparatus; and
when the response signal comprises a relay permission signal from the second radio communication apparatus, send the first data, as relay data, to the second radio communication apparatus, and the first data is to be transmitted to the gateway apparatus by the second radio communication apparatus.

23. The radio communication system of claim 22, wherein the second radio communication apparatus is configured to:
receive the relay request signal from the first radio communication apparatus during the common slot of the radio frame;
responsive to the relay request signal, send the response signal to the first radio communication apparatus;
receive the first data, as the relay data, from the first radio communication apparatus during the second time slot of the radio frame; and
send the first data to the gateway apparatus during the second time slot of the radio frame.

24. The radio communication system of claim 22, wherein the first radio communication apparatus is further configured to send the first data to the second radio communication apparatus during the second time slot allocated to the second radio communication apparatus.

25. The radio communication system of claim 22, wherein the first radio communication apparatus is further configured to, after sending the first data to the second radio communication apparatus for relaying the first data to the gateway apparatus, place the first radio communication apparatus in a power saving mode.

26. The radio communication system of claim 22, wherein the first radio communication apparatus is further configured to, when the response signal comprises the relay permission signal from the second radio communication apparatus, determine whether to send the first data, as the relay data, to the second radio communication apparatus in a current radio frame, based on a probability calculation.

27. The radio communication system of claim 26, wherein the probability calculation is based on at least one of: a signal quality of the gateway apparatus and relay history information.

28. The radio communication system of claim 26, wherein the probability calculation is based on a number of available radio communication apparatuses that can be used as relay terminals by the first radio communication apparatus.

29. A radio communication apparatus for digital communication in a system comprising a gateway apparatus, the radio communication apparatus, and another radio communication apparatus, the radio communication apparatus and the other radio communication apparatus each being configured to wirelessly transmit data to the gateway apparatus, the radio communication apparatus comprising:
a memory; and
a processor configured to:
send first data read from the memory to the gateway apparatus during a first time slot of a radio frame, the radio frame comprising a common slot different from the first slot and a second time slot, the first time slot allocated to the radio communication apparatus for data transmission, and the second time slot allocated to the other radio communication apparatus for data transmission,
determine whether the first data has been received by the gateway apparatus, and
upon determining that the first data has not been received by the gateway apparatus, send a relay request signal to the other radio communication apparatus during the common slot of the radio frame;
in response to the relay request signal, receive a response signal from the other radio communication apparatus; and
when the response signal comprises a relay permission signal from the other radio communication apparatus, send the first data, as relay data, to the other radio communication apparatus, and the first data is to be transmitted to the gateway apparatus by the other radio communication apparatus.

30. A radio communication apparatus for digital communication in a system comprising a gateway apparatus, another radio communication apparatus, and the radio communication apparatus, the other radio communication apparatus and the radio communication apparatus each being configured to wirelessly transmit data to the gateway apparatus, the radio communication apparatus comprising:
a memory; and
a processor configured to:
receive a relay request signal from the other radio communication apparatus during a common slot different from a first and second time slots, of a radio frame, the radio frame comprising the common slot, the first time slot allocated to the other radio communication apparatus for data transmission, and the second time slot allocated to the radio communication apparatus for data transmission;
in response to the relay request signal, send a response signal to the other radio communication apparatus;
receive the first data, as relay data, from the other radio communication apparatus during the second time slot of the radio frame, and store the first data to the memory; and
send the first data read from the memory to the gateway apparatus during the second time slot of the radio frame.

* * * * *